United States Patent
Schrader et al.

(10) Patent No.: US 6,949,250 B2
(45) Date of Patent: Sep. 27, 2005

(54) SELECTIVE ALGAECIDES FOR CONTROL OF CYANOCHLORONTA

(75) Inventors: Kevin K. Schrader, Oxford, MS (US); N. P. Dhammika Nanayakkara, Oxford, MS (US)

(73) Assignees: The United States of America as represented by the Secretary of Agriculture, Washington, DC (US); The University of Mississippi, University, MS (US)

( * ) Notice: Subject to any disclaimer, the term of this patent is extended or adjusted under 35 U.S.C. 154(b) by 0 days.

(21) Appl. No.: 10/320,651

(22) Filed: Dec. 16, 2002

(65) Prior Publication Data

US 2004/0116536 A1 Jun. 17, 2004

(51) Int. Cl.$^7$ .................... A01N 25/00; A01N 35/00; A01N 37/00; A61K 31/12; A61K 31/19

(52) U.S. Cl. .................... 424/405; 504/161; 504/348; 514/682; 514/680; 514/553; 514/557; 514/569; 514/577

(58) Field of Search .................... 424/405; 504/161, 504/348; 514/682, 680, 553, 557, 569, 577; 552/208, 210

(56) References Cited

U.S. PATENT DOCUMENTS

| | | | | |
|---|---|---|---|---|
| 3,909,324 A | * | 9/1975 | Niles | 149/76 |
| 6,340,468 B1 | * | 1/2002 | Cutler et al. | 424/405 |
| 6,376,511 B2 | * | 4/2002 | McChesney et al. | 514/311 |
| 6,576,674 B2 | * | 6/2003 | Cutler et al. | 514/680 |

OTHER PUBLICATIONS

AN 1966:3981 HCAPLUS, abstract of SU 172940. See the compound of RN 4569–25–9 HCAPLUS and 4569–47–5 HCAPLUS.*

AN 1985:24407 HCAPLUS, abstract of Zhurnal Organicheskoi Khimii (1984), 20(7), 1553–61. See compound of RN 93788–03–HCAPLUS.*

Crozet et al. (DN 120:243,733, HCAPLUS, abstract of Tetrahederon, (1993), 49(48), 11253–62).*

Sarkar et al. (DN 102:203,856, HCAPLUS, abstract of J of the Indian Chemical Society (1984), 61(7), 611–13).*

K.K. Schrader et al., Selective Growth Inhibition of the Musty–Odor Producing Cyanobacterium *Oscillatoria cf. chalybea* by Natural Compounds, Bull. Environ. Contam. Toxicol. (1998) 60:651–658.

K.K. Schrader et al., Evaluation of Limnocorrals for Studying the Effects of Phytotoxic Compounds on Plankton and Water Chemistry in Aquaculture Ponds, Journal of the World Aquaculture Society, vol. 31, No. 3, Sep. 2000.

K.K. Schrader et al., 9,10–Anthraquinone Reduces the Photosynthetic Efficiency of *Oscillatoria perornata* and Modifies Cellular Inclusions, Int. J. Plant Sci. 161(2):265–270, 2000.

K.K. Schrader et al., A Rapid Bioassay for Selective Algicides, Weed Technology, vol. 11:767–774, 1997.

* cited by examiner

*Primary Examiner*—Sabiha N. Qazi
(74) *Attorney, Agent, or Firm*—John D. Fado; Curtis P. Ribando; Lesley Shaw

(57) ABSTRACT

We have now discovered that certain 9,10-anthraquinone derivatives we developed possess potent activity against *O. perornata* while possessing a sufficiently high level of solubility in water to make their activity against *O. perornata* viable. These compounds possess a high level of activity against *O. perornata* yet are relatively non-toxic to green algae and fishes. The compounds also possess a relatively short half-life. The compounds represent a new means to providing compounds possessing a high degree of selective activity against blue-green algae while being physiologically tolerated by catfish and green algae. The compounds provide a means for controlling blue-green algae in managed bodies of water that are destined for public use or consumption.

12 Claims, No Drawings

SELECTIVE ALGAECIDES FOR CONTROL OF CYANOCHLORONTA

BACKGROUND OF THE INVENTION

1. Field of the Invention

The invention relates to the discovery of compounds and their use in the selective control of blue-green algae, also referred to as cyanobacteria, (Cyanochloronta) in managed bodies of water, and deals particularly with the use of certain derivatives of 9,10-anthraquinone for such a purpose.

Geosmin and 2-methylisoborneol (MIB) are released into the pond water from producing species of cyanobacteria, and these compounds are quickly absorbed into the adipose tissue of catfish. Producers must hold catfish that are determined to be off-flavor by trained individuals at processing plants until they are deemed to be "on-flavor." These delays in harvest can last for several days or weeks depending upon the lipid content of the catfish, water temperature, and severity and longevity of the musty off-flavor episode in the production pond. Such delays result in economic losses to the producer due to: 1) additional feed costs; 2) interference with cash flow; and 3) the potential loss of diseased fish due to disease and predation.

Use of the instant invention is for the control of 2-methylisoborneol in water for the elimination of musty off-flavor in water and catfish raised in it. This condition costs the catfish industry up to $60 million dollars annually. The active agents do not kill off green algae at dosing concentration but are focal in their effect on blue-green algae. This allows for the maintenance of a more stable group (non-bloom forming) of diverse planktonic organisms which makes problems involving oxygen depletion and the build up of ammonia resulting from die-offs of the blue-green algae more subject to controlled management.

2. Description of the Prior Art

There are numerous chemical agents that are known to either kill or inhibit blue-green algae growth but each possess aspects limiting their usefulness with catfish rearing. Several agents kill all algae species and cause the creation of negative growth conditions, such as the development of low oxygenation conditions and a rise in ammonia concentrations when used. It is also common knowledge that several compounds must be applied at rates that are toxic not only to algae but also to fish. Another problem is that many compounds tend to persist in the aqueous environment for excessive periods of time. The closest prior art of which the applicants are aware is a publication by Schrader et al. entitled "Selective Growth Inhibition of the Musty-Odor Producing *Cyanobacterium Oscillatoria* cf. chalybea by Natural Compounds;" Bull. Environ. Contam. Toxicol. (1998)60:651–658 in which it is disclosed that 9,10-anthraquinone has potent activity toward *Oscillatoria perornata*, however insolubility in water precluded its usage to control *Oscillatoria perornata* in catfish ponds.

One of the management practices used by producers to prevent musty off-flavor episodes involves the application of algicides to fish ponds in order to kill or help prevent the growth of undesirable cyanobacteria. Copper sulfate, chelated-copper compounds, and the herbicide diuron are currently the only compounds approved by the United States Environmental Protection Agency (USEPA) for use in food-fish production ponds as algicides. In 1999, catfish farmers were granted an emergency exemption by the USEPA and United States Food and Drug Administration to permit the use of diuron as an algicide in catfish aquaculture ponds. However renewal of the exemption must occur annually and is not assured. Unfortunately, these algicides have the following undesirable characteristics: 1) broad-spectrum toxicity towards phytoplankton can result in the death of the entire phytoplankton community and subsequent water quality deterioration leading to the death of catfish; 2) long persistence of the compounds in the environment creates concerns about environmental safety; and 3) the public's negative perception of the use of synthetic herbicides (C. S. Tucker, Off-flavor problems in aquaculture. Rev. Fish. Sci. (2000), vol. 8, pp. 45–88).

Green algae (division Chlorophyta) are the preferred type of phytoplankton over cyanobacteria in catfish production ponds for several reasons (H. W. Paerl and C. S. Tucker, Ecology of blue-green algae in aquaculture ponds. J. World Aquacult. Soc. (1995), vol. 26, pp. 109–131), including the following: 1) green algae have never been linked to off-flavor problems in farm-raises catfish; 2) green algae provide a more substantial base for aquatic food chains than cyanobacteria; 3) green algae are better oxygenators of the water than cyanobacteria; and 4) certain types of cyanobacteria can produce toxins and, in one case, have been implicated in causing the deaths of farm-raised catfish. The discovery of environmentally-safe, selective algicides that help prevent the growth of cyanobacteria responsible for causing musty off-flavor in pond-cultured catfish would greatly benefit the catfish aquaculture industry.

Previous research (K. K. Schrader, M. Q. de Regt, P. D. Tidwell, C. S. Tucker and S. O. Duke, Selective growth inhibition of the musty-odor producing cyanobacterium *Oscillatoria cf. chalybea* by natural compounds. Bull. Environ. Contam. Toxicol. (1998a), vol. 60, pp. 651–658) has identified several natural compounds from plants that are selectively toxic towards *O. perornata*. Of these compounds, 9,10-anthraquinone has a high degree of selective toxicity towards *O. perornata* in the laboratory and inhibits photosynthesis (K. K. Schrader, F. E. Dayan, S. N. Allen, M. Q. de Regt, C. S. Tucker, and R. N. Paul, Jr., 9,10-Anthraquinone reduces the photosynthetic efficiency of *Oscillatoria perornata* and modifies cellular inclusions. Int. J. Plant Sci. (2000), vol. 161(2), pp. 265–270). Pond efficacy testing of 9,10-anthraquinone dissolved in ethanol (anthraquinone is insoluble in water) using limnocorrals (K. K. Schrader, C. S. Tucker, M. Q. de Regt and S. K. Kingsbury, Evaluation of limnocorrals for studying the effects of phytotoxic compounds on plankton and water chemistry in aquaculture ponds. J. World Aquacult. Soc. (2000), vol. 31, pp. 403–415) did not effectively reduce numbers of *O. perornata* or reduce MIB levels compared to positive laboratory results (unpublished observations). Additional pond efficacy testing of several different formulations of 9,10-anthraquinone (e.g., incorporation with hydoxypropylmethyl-cellulose or HPMC; Tween 80 and canola oil emulsion) to maintain sufficient phytotoxic levels, determined by laboratory tests, of anthraquinone towards *O. perornata* in the water column also did not produce positive results (unpublished observations).

While various methodologies for the control of blue-green algae exist, there remains a need for the creation of alternate viable and cost-effective compounds for the selective control of blue-green algae without causing the creation of negative side effects for fish.

SUMMARY OF THE INVENTION

We have now discovered that certain 9,10-anthraquinone derivatives were developed which possess potent activity against *O. perornata* while possessing a sufficiently high level of solubility in water to make their activity against *O. perornata* viable. These compounds possess a high level of activity against *O. perornata* yet are relatively non-toxic to green algae and fishes. The compounds also possess a relatively short half-life in the pond water.

In accordance with this discovery, it is an object of the invention to provide compounds possessing a high degree of selective activity against blue-green algae while being physiologically tolerated by catfish and green algae.

Another object is to provide methods of selectively eliminating blue-green algae which produce geosmin and 2-methylisoborneol while being tolerated by fish and green algae.

Another object is to provide methods of controlling algae in managed bodies of water that are destined for public use or consumption.

Other objects and advantages of the invention will become readily apparent from the ensuing description.

DETAILED DESCRIPTION OF THE INVENTION

It has been found that novel derivatives of 9,10-anthraquinone that were synthesized in the laboratory are effective in controlling certain species of cyanobacteria. In addition, the novel derivatives of 9,10-anthraquinone can control and reduce the cyanobacteria that are responsible for contributing to off-flavor in commercially-raised fish and in fresh water, and these derivatives can improve the water quality of aquaculture and fresh water supplies.

These were screened in the laboratory by the method of Schrader et al. (K. K. Schrader, M. Q. de Regt, C. S. Tucker and S. O. Duke, A rapid bioassay for selective algicides. Weed Technol. (1997), vol. 11, pp. 767–774) for algicidal activity.

The compounds of the present invention are those of the following structure and can be best represented as either 1 or 2 substituted derivatives of 9,10-anthraquinone.

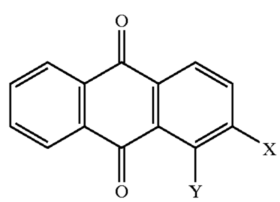

Wherein x and y are hydrogen or a primary, secondary or tertiary amine or a primary, secondary or tertiary aminomethyl, a polyether or polyetherhydroxymethyl wherein y is hydrogen or a primary, secondary or tertiary amine or tertiary aminomethyl or polyether or polyetherhydroxymethyl; with the proviso that either x or y, but not both, is hydrogen.

A number of preferred compounds are those such as the following:

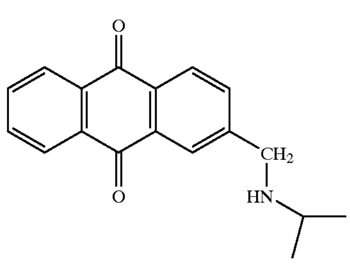

2-[Methylamino-N-(1'-methylethyl)]-9,10-anthraquinone (DNA2-59-1) or its environmentally acceptable acid addition salt wherein the acid addition salt may be either organic or inorganic in nature. Suitable inorganic acids for salt formation include but are not restricted to: phosphoric acid, hydrochloric acid, sulfuric acid or hydrobromic acid. Suitable organic acids for the formation of salts may include, but are not restricted to; acetic acid, formic acid, succinic acid, citric acid, and fumaric acid.

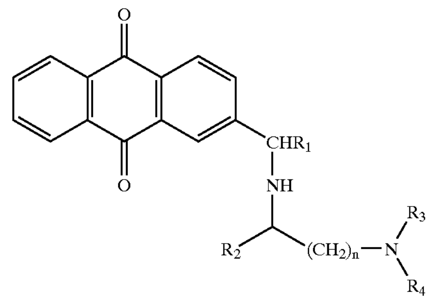

Wherein $R_1$ is hydrogen or methyl group, wherein n is 1, 2, 3, 4, 5, or 6, wherein $R_2$, $R_3$ and $R_4$ are hydrogen, methyl or ethyl group, wherein the compound is a free amine or environmentally acceptable acid amine salt. A particularly preferred compound in this group is 2-[methylamino-N-(1'-methyl-4'-N,N-diethylaminobutyl)]anthraquinone diphosphate (DNA1-19-1).

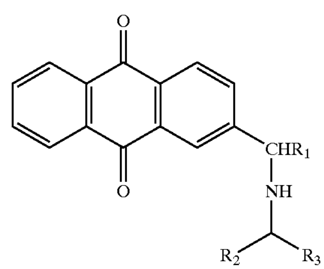

Wherein $R_1$ is hydrogen or methyl group, wherein $R_2$ and $R_3$ are hydrogen, methyl, ethyl, straight-chain alkyl group having 3 to 8 carbon atoms or cyclic alkyl group having 3 to 6 carbon atoms, wherein the compound is a free amine or environmentally acceptable acid addition salt.

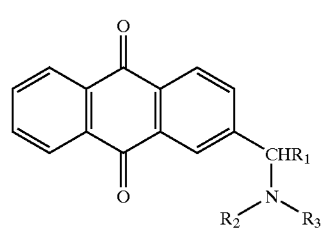

Wherein $R_1$ is hydrogen or methyl group, wherein $R_2$ and $R_3$ are hydrogen, methyl, ethyl, straight-chain alkyl group having 3 to 8 carbon atoms or cyclic alkyl group having 3 to 6 carbon atoms, wherein the compound is a free amine or environmentally acceptable acid addition salt.

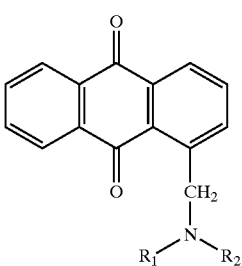

Wherein $R_1$ and $R_2$ are methyl, ethyl group, straight-chain alkyl group having 3 to 8 carbon atoms or cyclic alkyl group having 3 to 6 carbon atoms, wherein the compound is a free amine or environmentally acceptable acid addition salt.

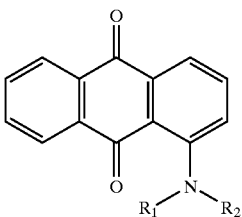

Wherein $R_1$ and $R_2$ are hydrogen, methyl, ethyl, straight-chain alkyl group having 3 to 8 carbon atoms or cyclic alkyl group having 3 to 6 carbon atoms, wherein the compound is a free amine or environmentally acceptable acid addition salt.

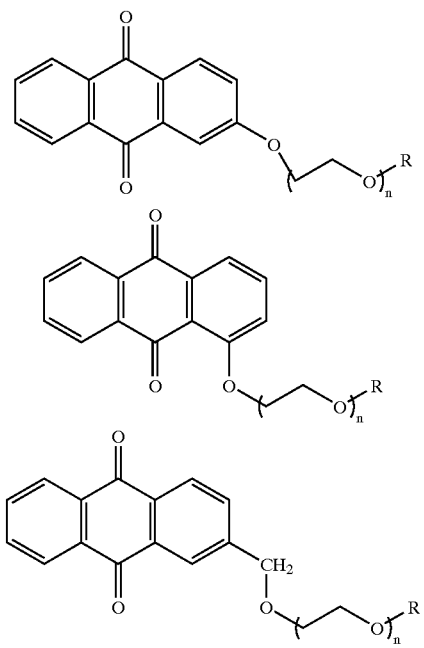

Wherein n is 1, 2, 3, 4, 5, 6 or 7, wherein R is hydrogen or methyl group.

Synthesis of Anthraquinone Derivatives

Analogs of modified 9,10-anthraquinone were synthesized in the laboratory. The first analog tested was 2-[methylamino-N-(1'-methyl-4'-N'N'-diethylaminobutyl)]-9,10-anthraquinone diphosphate with a molecular weight of 574 and will be referred to as DNA1-19-1. The second primary analog pursued in this project was 2-[Methylamino-N-(1'-methyl)]-9,10-anthraquinone monophospate with a molecular weight of 377 and will be referred to as DNA2-59-1. Both of these analogs of 9,10-anthraquinone are soluble in water. Dozens of other analogs of the modified 9,10-anthraquinone were tested in the laboratory, but DNA1-19-1 and DNA2-59-1 gave the best results as selective algicides. The method of synthesis for the anthraquinone analogs that were screened is provided below. The following examples are intended to further illustrate the invention and are not intended to limit the scope of the invention which is defined by the claims.

The present invention involves the use of the disclosed 9,10-anthraquinone derivatives to control the growth of blue-green algae (cyanobacteria) in water supplies. Specifically, the claimed invention can be used in catfish rearing facilities to help preclude the formation and adsorption of compounds such as geosmin and 2-methylisoboreanol (MIB) from such cyanobacteria. The compounds exhibit focal functional activity against blue-green algae and appear, at the dosages used, to be non-challenging to green algae and to fish. The compounds appear to have a relatively short half-life on the order of a couple of days or less which makes them not persist in the environment and assists in their suitability for use with food related crops. The present method of controlling blue-green algae in an aqueous medium advantageously comprises adding to such medium in an amount ranging from about 0.038 ppm to about 0.125 ppm of a 9,10-anthraquinone derivative.

The compounds described act as toxins and because of this control is quickly achieved when a certain concentration of active agent is maintained for a standard period of time. The activity ascribed to these compounds is such that complete control can be achieved at concentrations ranging down to 0.100 ppm in water. For most applications where an entire body of water such as a pond is being treated, concentrations ranging from about 0.038 to 0.125 ppm will be quite effective with no harm to either fish or green algae. The preferred concentration range will typically be from about 0.100 to about 0.125 ppm. The lower range of concentrations from about 0.038 ppm to about 0.100 ppm may be used to prevent the growth of blue-green algae, maintain better plankton diversity, and help increase the abundance of preferred types of phytoplankton (e.g., green algae) in aquaculture. The higher concentrations of 0.100 to about 0.125 ppm would be of use to kill the blue-green algae.

Treatment is best accomplished by spraying on the water or by subsurface injection, with the desire for as even a distribution as possible in the area to be treated. Spraying equipment is preferably used with aqueous solutions. The body of water to be treated (e.g., catfish pond) should not be mixed (e.g., by mechanical aerators, etc.) before or during application of the treating solution. In general the treating solution will contain about 0.01 to about 99.00% by weight of active ingredient. Although the product is water soluble at the concentrations used, it may be desirable to add a mixing aid in the original concentrate used to prepare the treating composition. For this purpose a water-soluble alcohol such as isopropyl alcohol may be used. A dispersant in the formulation will normally represent from about 15% to about 30% the weight of the composition.

As indicated, the active agents described above are effective in accord with this invention for the selective control of blue-green algae in aquatic systems. It is particularly important that blue-green algae can be controlled with a readily biodegradable active agent. In addition to treating lakes and pond, the invention is useful for the treatment and control of blue-green algae in various aqueous systems.

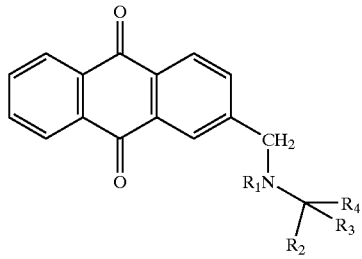

1: $R_1$ = H, $R_2$ = $CH_3$, $R_3$ = $CH_3$, $R_4$ = H
2: $R_1$ = H, $R_2$ = H, $R_3$ = H, $R_4$ = H
3: $R_1$ = H, $R_2$ = $CH_3$, $R_3$ = H, $R_4$ = H
4: $R_1$ = H, $R_2$ = $CH_2CH_3$, $R_3$ = H, $R_4$ = H
5: $R_1$ = H, $R_2$ = $CH_3$, $R_3$ = $CH_3$, $R_4$ = $CH_3$
6: $R_1$ = H, $R_2$, $R_3$ = $CH_2CH_2$, $R_4$ = H
7: $R_1$ = H, $R_2$ = $(CH_2)_3CH_3$, $R_3$ = H, $R_4$ = H
8: $R_1$ = H, $R_2$ = $CH_3$, $R_3$ = $(CH_2)_2CH_3$, $R_4$ = H
9: $R_1$ = $CH_3$, $R_2$ = H, $R_3$ = H, $R_4$ = H
10: $R_1$ = $CH_2CH_3$, $R_2$ = $CH_3$, $R_3$ = H, $R_4$ = H
11: $R_1$ = $(CH_2)_3CH_3$, $R_2$ = $(CH_2)_2CH_3$, $R_3$ = H, $R_4$ = H

EXAMPLE 1

Synthesis of 2-methylamino-analogs of 9,10-anthraquinone

General Procedure 2-chloromethylanthraquinone or 2-bromomethylanthraquinone was heated for 15–40 minutes at 80° C. with excess amine in the presence or absence of dimethyl sulfoxide co-solvent. The reaction mixture was cooled and mixed with ice-cold dilute hydrochloric acid and extracted with an organic solvent such as diethyl ether, ethyl acetate or methylene chloride. The aqueous layer was then basified with 20% sodium hydroxide solution and extracted with an organic solvent such as diethyl ether, ethyl acetate or methylene chloride. This extract was washed with water, dried over anhydrous sodium sulfate and evaporated. The product obtained was dissolved in methanol and precipitated as phosphate salt by treating with phosphoric acid. The precipitate was filtered off.

Specific Description

Preparation of 2-[methylamino-N-(1'-methylethyl)]-9,10-anthraquinone monophosphate (DNA2-59-1) (1)

A mixture of 2-chloromethylanthraquinone (10 gm), isopropylamine (15 ml) and dimethyl sulfoxide (15 ml) was heated for 30 minutes at 80° C. The reaction mixture was poured into ice-cold 5% HCl solution (500 ml) and extracted three times with methylene chloride (200 ml). The aqueous layer was basified (pH 12) with sodium hydroxide solution (10%) and extracted three times with diethyl ether. The combined ether layer was washed with water, dried over sodium sulfate and evaporated to give 2-[methylamino-N-(1'-methylethyl)]-9,10-anthraquinone. The purity and identity of the material was assessed by high resolution mass spectrometry (HRMS) and nuclear magnetic resonance (NMR).

HRMS: 280.1316 (M+H$^+$, $C_{18}H_{18}NO_2$, Cald. 280.1337)

NMR: δ(CDCl$_3$, 300 MHz) 1.05 (6H, d, J=6.2 Hz, CH(CH$_3$)$_2$), 2.80 (1H, septet, J=6.2 Hz, CH(CH$_3$)$_2$), 3.84 (2H, s, 2-CH$_2$), 7.65–7.68 (3H, m, 3,6,7-H), 8.07–8.15 (4H, m, 1,4,5,8-H)

This product was dissolved in methanol (500 ml) and treated with methanolic phosphoric acid (10 ml of 85% of H$_3$PO$_4$ in 90 ml of methanol) under stirring and left overnight at room temperature and filtered to give 2-[methylamino-N-(1'-methylethyl)]-9,10-anthraquinone monophosphate (10.5 gm).

Anal. C, 57.59; H, 5.48; N, 3.94; P, 8.07% calcd for $C_{18}H_{17}NO_2 \cdot H_3PO_4$ C, 57.30; H, 5.34; N, 3.71; P, 8.21%.

Chemicals reactants were modified but the same protocol was followed to produce compounds 2 through 11.

2-[Methylamino-N-(methyl)]-9,10-anthraquinone monophosphate (DNA3-19-1) (2)

This compound was prepared by the general procedure using reagents 2-chloromethylanthraquinone, and methylamine (2M, in dry tetrahydrofuran) in the presence of dimethyl sulfoxide co-solvent.

HRMS: m/e 252.0997 (M+H$^+$, $C_{16}H_{13}NO_2$, Cald. 252.1024)

NMR: δ(CDCl$_3$, 300 MHz) 2.48 (3H, s, CH$_3$), 3.92 (2H, s, 2-CH$_2$), 7.76–7.80 (3H, m, 3,6,7-H), 8.22–8.29 (4H, m, 1,4,5,8-H)

Anal. C, 55.36; H, 5.67; N, 3.94; P, 9.08% calcd for $C_{16}H_{17}NO_2 \cdot H_3PO_4$ C, 55.02; H, 4.62; N, 4.01; P, 8.87%

2-[Methylamino-N-(ethyl)]-9,10-anthraquinone monophosphate (DNA3-17-1) (3)

This compound was prepared by the general procedure using reagents 2-chloromethylanthraquinone, and ethylamine (2M, in dry tetrahydrofuran) in the presence of dimethyl sulfoxide co-solvent HRMS: m/e 266.1153 (M+H$^+$, $C_{17}H_{16}NO_2$, Cald. 266.1181)

NMR: δ(CDCl$_3$, 300 MHz) 1.12 (3H, t, J=7.1 Hz, CH$_2$CH$_3$), 2.26 (2H, q, J=7.1 Hz, CH$_2$CH$_3$), 3.90 (2H, s, 2-CH$_2$), 7.70–7.73 (3H, m, 3,6,7-H), 8.13–8.22 (4H, m, 1,4,5,8-H)

Anal. C, 56.49; H, 5.22; N, 3.89; P, 8.24% calcd for $C_{17}H_{15}NO_2 \cdot H_3PO_4$ C, 56.20; H, 4.99; N, 3.86; P, 8.53%

2-[Methylamino-N-(propyl)]-9,10-anthraquinone monophosphate (DNA3-31-1) (4)

This compound was prepared by the general procedure using reagents 2-chloromethylanthraquinone, and propyl amine in the presence of dimethyl sulfoxide co-solvent.

HRMS: m/e 280.1321 (M+H$^+$, $C_{18}H_{18}NO_2$, Cald. 280.1259)

NMR: δ(CDCl$_3$, 300 MHz) 0.93 (3H, t, J=7.0 Hz, NHCH$_2$CH$_2$CH$_3$), 1.56 (2H, hextet, J=6.9 Hz, NHCH$_2$CH$_2$CH$_3$), 2.62 (2H, t, J=6.9 Hz, NHCH$_2$CH$_2$CH$_3$), 3.95 (2H, s, 2-CH$_2$), 7.77–7.79 (3H, m, 3,6,7-H), 8.22–8.30 (4H, m, 1,4,5,8-H)

Anal. C, 57.19; H, 5.45; N, 3.82; P, 7.98% calcd for $C_{18}H_{17}NO_2 \cdot H_3PO_4$ C, 57.30; H, 5.36; N, 3.71; P, 8.21%

2-[Methylamino-N-(1'1'-dimethylethyl)]-9,10-anthraquinone monophosphate (DNA3-33-1) (5)

This compound was prepared by the general procedure using reagents 2-chloromethylanthraquinone, and tertiary-butylamine in the presence of dimethyl sulfoxide co-solvent.

HRMS: m/e 294.1483 (M+H$^+$, $C_{19}H_{20}NO_2$, Cald. 294.1494)

NMR: δ(CDCl$_3$, 300 MHz) 1.19 (9H, s, C(CH$_3$)$_3$) 3.90 (2H, s, 2-CH$_2$), 7.77–7.82 (3H, m, 3,6,7-H), 8.23–8.31 (4H, m, 1,4,5,8-H)

Anal. C, 58.11; H, 5.83; N, 3.52; P, 7.69% calcd for $C_{19}H_{19}NO_2 \cdot H_3PO_4$ C, 58.31; H, 5.67; N, 3.58; P, 7.91%

2-[Methylamino-N-(cyclopropyl)]-9,10-anthraquinone monophosphate (DNA3-35-1) (6)

This compound was prepared by the general procedure using reagents 2-chloromethylanthraquinone, and cyclopropylamine in the presence of dimethyl sulfoxide co-solvent.

HRMS: m/e 278.1155 (M+H$^+$, C$_{18}$H$_{16}$NO$_2$, Cald. 278.1181)

NMR: δ(CDCl$_3$, 300 MHz) 0.43 (4H, m, —C$\underline{H}_2$—C$\underline{H}_2$—), 2.17 (1H, m, CHNH), 4.01 (2H, s, 2-CH$_2$), 7.75–7.81 (3H, m, 3,6,7-H), 8.23–8.32 (4H, m, 1,4,5,8-H)

Anal. C, 57.74; H, 5.09; N, 3.51; P, 8.21% calcd for C$_{18}$H$_{15}$NO$_2$.H$_3$PO$_4$ C, 57.60; H, 4.83; N, 3.73; P, 8.25%

2-[Methylamino-N-(pentyl)]-9,10-anthraquinone monophosphate (DNA2-55-1) (7)

This compound was prepared by the general procedure using reagents 2-chloromethylanthraquinone, and pentylamine in the presence of dimethyl sulfoxide co-solvent.

HRMS: m/e 308.1619 (M+H$^+$, C$_{20}$H$_{22}$NO$_2$, Cald. 308.1645)

NMR: δ(CDCl$_3$, 300 MHz) 0.78 (3H, t, J=6.7 Hz, 5'-CH$_3$), 1.19 (4H, m, 3' and 4'-CH$_2$), 1.44 (2H, m, 2'-CH$_2$), 2.53 (2H, t, J=7.4 Hz, 1'-CH$_2$), 3.82 (2H, s, 2-CH$_2$), 7.63–7.68 (3H, m, 3,6,7-H), 8.06–8.14 (4H, m, 1,4,5,8-H)

Anal. C, 59.53; H, 6.25; N, 3.66; P, 7.46% calcd for C$_{20}$H$_{21}$NO$_2$.H$_3$PO$_4$ C, 59.26; H, 5.97; N, 3.46; P, 7.64%

2-[Methylamino-N-(1'-methylbutyl)]-9,10-anthraquinone monophosphate (DNA2-53-1) (8)

This compound was prepared by the general procedure using reagents 2-chloromethylanthraquinone, and 1-methylbutylamine in the presence of dimethyl sulfoxide co-solvent.

HRMS: m/e 308.1619 (M+H$^+$, C$_{20}$H$_{22}$NO$_2$, Cald. 308.1645)

NMR: δ(CDCl$_3$, 300 MHz) 0.89 (3H, t, J=7.1 Hz, NHCH(CH$_3$)CH$_2$CH$_2$C$\underline{H}_3$) 1.08 (3H, d, J=6.2 Hz, NHCH(C$\underline{H}_3$)CH$_2$CH$_2$CH$_3$), 1.33 (2H, m, NHCH(CH$_3$)CH$_2$C$\underline{H}_2$CH$_3$), 1.46 (2H, m, NHCH(CH$_3$)C$\underline{H}_2$CH$_2$CH$_3$), 2.68 (1H, J=6 Hz, NHC$\underline{H}$(CH$_3$)CH$_2$CH$_2$CH$_3$), 3.89, 3.97 (2H, 2×AB doublets, J=14.2 Hz, 2-CH$_2$), 7.74–7.77 (3H, m, 3,6,7-H), 8.20–8.28 (4H, m, 1,4,5,8-H)

Anal. C, 59.11; H, 5.86; N, 3.37; P, 7.51% calcd for C$_{20}$H$_{21}$NO$_2$.H$_3$PO$_4$ C, 59.26; H, 5.97; N, 3.46; P, 7.64%

2-[Methylamino-N,N-(di-1'-methylethyl)]-9,10-anthraquinone monophosphate (DNA2-49-1) (9)

This compound was prepared by the general procedure using reagents 2-chloromethylanthraquinone, and diisopropylamine in the presence of dimethyl sulfoxide co-solvent.

HRMS: m/e 322.1767 (M+H$^+$, C$_{21}$H$_{24}$NO$_2$, Cald. 322.1802)

NMR: δ(CDCl$_3$, 300 MHz) 1.03 (12H, d, J=6.5 Hz, N—CH(C$\underline{H}_3$)$_2$) 3.03 (2H, septet, J=6.5 Hz, N—C$\underline{H}$(CH$_3$)$_2$), 3.78 (2H, s, 2-CH$_2$), 7.75–7.88 (3H, m, 3,6,7-H), 8.21–8.31 (4H, m, 1,4,5,8-H)

Anal. C, 60.22; H, 6.20; N, 3.39; P, 7.51% calcd for C$_{21}$H$_{23}$NO$_2$.H$_3$PO$_4$ C, 60.14; H, 6.25; N, 3.34; P, 7.39%

2-[Methylamino-N,N-(diethyl)]-9,10-anthraquinone monophosphate (DNA2-51-1) (10)

This compound was prepared by the general procedure using reagents 2-chloromethylanthraquinone, and diethylamine amine in the presence of dimethyl sulfoxide co-solvent.

HRMS: m/e 294.1473 (M+H$^+$, C$_{19}$H$_{20}$NO$_2$, Cald. 294.1488)

NMR: δ(CDCl$_3$, 300 MHz) 1.03 (6H, t, J=7.1 Hz, —N(CH$_2$C$\underline{H}_3$)$_2$), 2.52 (4H, t, J=7.1 Hz, —N(C$\underline{H}_2$CH$_3$)$_2$) 3.67 (2H, s, 2-CH$_2$) 7.71–7.80 (3H m, 3,6,7-H), 8.17–8.24 (4H, m, 1,4,5,8-H)

Anal. C, 58.12; H, 5.69; N, 3.71; P, 7.72% calcd for C$_{19}$H$_{19}$NO$_2$.H$_3$PO$_4$ C, 58.31; H, 5.67; N, 3.58; P, 7.91%

2-[Methylamino-N,N-(dibutyl)]-9,10-anthraquinone monophosphate (DNA2-57-1) (11)

This compound was prepared by the general procedure using reagents 2-chloromethylanthraquinone, and dibutylamine in the presence of dimethyl sulfoxide co-solvent.

HRMS: m/e 350.2077 (M+H$^+$, C$_{23}$H$_{27}$NO$_2$, Cald. 350.2118)

NMR: δ(CDCl$_3$, 300 MHz) 0.83 (6H, t, J=7.2 Hz, N—(CH$_2$CH$_2$CH$_2$C$\underline{H}_3$)$_2$) 1.27 (4H, m, N—(CH$_2$CH$_2$C$\underline{H}_2$CH$_3$)$_2$), 1.43 (4H, m, N—(CH$_2$C$\underline{H}_2$CH$_2$CH$_3$)$_2$), 2.41 (4H, t, J=7.4 Hz, N—(C$\underline{H}_2$CH$_2$CH$_2$CH$_3$)$_2$), 3.65 (2H, s, 2-CH$_2$), 7.69–7.72 (3H, m, 3,6,7-H), 8.15–8.22 (4H, m, 1,4,5,8-H)

Anal. C, 59.29; H, 6.57; N, 3.33; P, 7.11% calcd for C$_{23}$H$_{27}$NO$_2$.H$_3$PO$_4$ C, 61.74; H, 6.76; N, 3.13; P, 6.92%

EXAMPLE 2

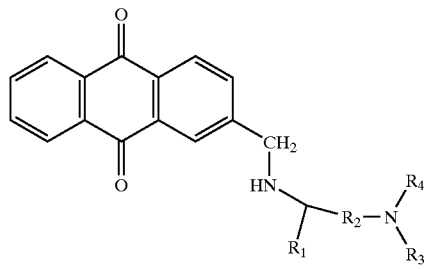

12: R$_1$ = CH$_3$, R$_2$ = CH$_2$CH$_2$CH$_2$, R$_3$ = CH$_2$CH$_3$, R$_4$ = CH$_2$CH$_3$
13: R$_1$ = H, R$_2$ = CH$_2$CH$_2$, R$_3$ = CH$_3$, R$_4$ = CH$_3$
14: R$_1$ = H, R$_2$ = CH$_2$CH$_2$, R$_3$ = CH$_2$CH$_3$, R$_4$ = CH$_2$CH$_3$

Preparation of 2-[methylamino-N-(1'-methyl-4'-N,N-diethylaminobutyl)]-9,10-anthraquinone diphosphate (DNA1-19-1) (12)

A mixture of 2-(chloromethyl)anthraquinone (20 g) and 2-amino-5-diethylaminopentane (50 ml) was stirred under nitrogen atmosphere at 80° C. for 40 minutes. The reaction mixture was poured into ice-cold HCl (5%, 500 ml) and extracted with ether (3×150 ml). The ether layer was discarded and the aqueous layer was basified with cold aqueous NaOH (10%) to pH 12 and extracted ether (3×300 ml). The ether extract was washed with water (3×300 ml) dried over anhydrous NaSO4 and evaporated to dryness under vacuum. The crystalline residue obtained was dissolved in methanol (700 ml) and mixed with phosphoric acid (85%, 25 ml in 75 ml of methanol) with efficient mixing. The mixture was allowed to stand for 1 hour, filtered, washed with methanol (4×50 ml) and dried to give 2-[methylamino-N-(1'-methyl-4'-N,N-diethylaminobutyl)]-9,10-anthraquinone diphosphate as a pale yellow amorphous powder (32.8 gm).

HRMS: m/e 379.2399 (M+H$^+$, C$_{24}$H$_{31}$N$_2$O$_2$, Cald. 379.2385)

NMR: δ(CDCl$_3$, 300 MHz) 0.87 (6H, t, J=7.2 Hz, CH$_2$C$\underline{H}_3$), 0.99 (3H, d, J=6.2 Hz, C$\underline{H}_3$—CHCH$_2$CH$_2$CH$_2$N) 1.21

(2H, m, CH₃—CHCH₂CH₂CH₂N) 1.38 (2H, m, 2H, CH₃—CHCH₂CH₂CH₂N) 2.27 (2H, dd, J=6.0, 8.9, CH₃—CHCH₂CH₂CH₂N), 2.38 (4H, q, J=7.2 Hz, —CH₂CH₃), 2.58 (1H, m, CH₃—CHCH₂CH₂CH₂N), 3.75 and 3.82 (1H each, d, J=14.2 Hz, 2-CH2), 7.60 (3H, m, 3,6,7-H) 8.22–8.29 (4H, m, 1,4,5,8-H)

Anal. C, 50.22; H, 6.20; N, 4.79; P, 10.71% calcd for C₂₄H₃₀N₂O₂.2H₃PO₄ C, 50.18; H, 6.32; N, 4.88; P, 10.78%

2-[Methylamino-N-(propyl-3'-N,N-diethylaminopropyl)]-9,10-anthraquinone diphosphate (DNA2-25-1) (13)

This compound was prepared by the general procedure using reagents 2-chloromethylanthraquinone and 3-diethylaminopropylamine as reagents and the same protocol which was used in the preparation of compound 12.

HRMS: m/e 351.2038 (M+H⁺, C₂₂H₂₇N₂O₂, Cald. 351.2067)

NMR: δ(CDCl₃, 300 MHz) 0.88 (6H, t, J=7.2, N(CH₂CH₃)₂), 1.57 (2H, m, NCH₂CH₂CH₂N), 2.37 (4H, t, J=7.1, N(CH₂CH₃)₂), 2.42 (2H, t, J=7.2 Hz, NCH₂CH₂CH₂N), 2.57 (2H, t, J=6.7 Hz, NCH₂CH₂CH₂N), 3.79 (2H, s, 2-CH₂), 7.61 (3H, m, 3,6,7-H), 8.02–8.11 (4H, m, 1,4,5,8-H)

Anal. C, 48.22; H, 5.84; N, 4.97; P, 11.45% calcd for C₂₂H₂₆N₂O₂.2H₃PO₄ C, 48.36; H, 5.90; N, 5.13; P, 11.34%

2-[Methylamino-N-(propyl-3'-N,N-dimethylamino)]-9,10-anthraquinone diphosphate (DNA2-23-1) (14)

This compound was prepared by the general procedure using reagents 2-chloromethylanthraquinone and 3-dimethylaminopropylamine as reagents and the same protocol which was used in the preparation of compound 12.

HRMS: m/e 323.1727 (M+H⁺, C₂₀H₂₂N₂O₂, Cald. 323.1738)

NMR: δ(CDCl₃, 300 MHz) 1.68 (2H, quintet, J=6.9 Hz, NHCH₂CH₂CH₂N₂), 2.20 (6H, s, N(CH₃)₂), 2.31 (2H, t, J=7.0 Hz, NHCH₂CH₂CH₂N), 2.67 (2H, t, J=6.9 Hz, NH CH₂CH₂CH₂N), 3.93 (2H, s, 2-CH₂), 7.74–7.77 (3H, m, 3,6,7-H), 8.19–8.27 (4H, m, 1,4,5,8-H)

Anal. C, 46.61; H, 5.30; N, 5.27; P, 11.78% calcd for C₂₀H₂₂N₂O₂.2H₃PO₄ C, 46.34; H, 5.44; N, 5.40; P, 11.95%

EXAMPLE 3

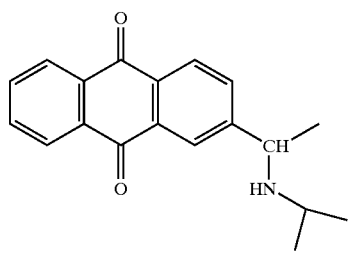

15

Synthesis of 2-ethyl-1'-amino-9,10-anthraquinone analogs
General Procedure

2(1'-Bromoethyl)anthraquinone was heated for 30–60 minutes at 80° C. with excess amine in the presence or absence of dimethyl sulfoxide co-solvent. The reaction mixture was cooled mixed with ice-cold dilute hydrochloric acid and extracted with an organic solvent such as such as diethyl ether, ethyl acetate or methylene chloride. The aqueous layer was then basified with 20% sodium hydroxide solution and extracted with an organic solvent such as diethyl ether, ethyl acetate or methylene chloride. This extract was washed with water, dried over anhydrous sodium sulfate and evaporated.

The product obtained was dissolved in methanol and precipitated as phosphate salt by treating with phosphoric acid. The precipitate was filtered off.

2-[1'-Amino-N-(1'-methylethyl)ethyl]-9,10-anthraquinone 9,10-anthraquinone (DNA2-89-1) (15)

Specific Description

2[1'-Bromoethyl]anthraquinone (2 gm) was refluxed for 1 hour with isopropylamine (5 ml) and dimethyl sulfoxide (5 ml). The reaction mixture was cooled mixed with ice-cold dilute hydrochloric acid (5%, 400 ml) and extracted three times with ether (100 ml). The aqueous layer was then basified (pH 12) with 20% sodium hydroxide solution and extracted three times with ether. The combined ether extract was washed with water, dried over anhydrous sodium sulfate and evaporated to give 2-[1'-amino-N-(1"-methylethyl) ethyl]-9,10-anthraquinone.

HRMS: 294.1512 (M+H⁺, C₁₉H₂₀NO₂, Cald. 294.1494)

NMR: δ(CDCl₃, 300 MHz) 0.97, 1.02 (6H, 2xd, J=6.3 Hz, NHCH(CH₃)₂), 1.36 (3H, d, J=6.6 Hz, —CH(NH)CH₃), 2.60 (1H, septet, J=6.2 Hz, NHCH(CH₃)₂), 4.06 (1H, q, J=6.6 Hz, CH(NH)CH₃), 7.72–7.78 (3H, m, 3,6,7-H), 8.19–8.28 (4H, m, 1,4,5,8-H)

Anal. C, 58.11; H, 5.76; N, 3.37; P, 7.71% calcd for C₁₉H₁₉N₂O₂.H₃PO₄ C, 58.31; H, 5.67; N, 3.58; P, 7.91%

The product obtained was dissolved in methanol and precipitated as phosphate salt by treating with phosphoric acid. The precipitate was filtered off.

EXAMPLE 4

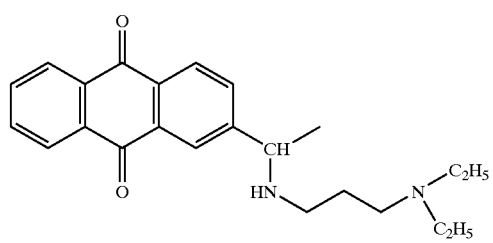

16

2-[1'-Amino-N-(propyl-3"-N,N-diethylamino)ethyl]-9,10-anthraquinone (DNA2-87-1) (16)

This compound was prepared by the general procedure using reagents 2-[1'-bromoethyl]anthraquinone and 3-diethylaminopropylamine as reagents and the general protocol described above in synthesis of 2-ethyl-1'-amino-9,10-anthraquinone analogs.

HRMS: 364.2168 (M+H⁺, C₂₃H₂₈N₂O₂, Cald. 364.2151)

NMR: δ(CDCl₃, 300 MHz) 0.94 (6H, t, J=7.1 Hz, NHCH₂CH₂CH₂N (CH₂CH₃)₂), 1.35 (3H, d, J=6.6 Hz, 2-CHNHCH₃) 1.58 (2H, quintet, J=6.9 Hz, NHCH₂CH₂CH₂N), 2.34–2.56 (8H, m, NHCH₂CH₂CH₂N(CH₂CH₃)₂), 3.89 (1H, q, J=6.5 Hz, CHNHCH₃), 7.71–7.77 (3H, m, 3,6,7,-H), 8.17–8.24 (4H, m, 1,4,5,8-H)

Anal. C, 49.16; H, 4.87; N, 4.87; P, 11.36% calcd for C₂₃H₂₈N₂O₂.2H₃PO₄ C, 49.29; H, 6.11; N, 5.00; P, 11.05%

EXAMPLE 5

Synthesis of 1-methylamino-analogs of 9,10-anthraquinone

General Procedure 1-chloromethylanthraquinone or 1-bromomethyl-anthraquinone was heated for 15–60 minutes at 80° C. with excess amine in the presence or absence of dimethyl sulfoxide co-solvent. The reaction mixture was cooled mixed with ice-cold dilute hydrochloric acid and extracted with an organic solvent such as such as diethyl ether, ethyl acetate or methylene chloride. The aqueous layer then basified with 20% sodium hydroxide solution and extracted with an organic solvent such as diethyl ether, ethyl actetat or methylene chloride. This extract was washed with water, dried over anhdrous sodium sulfate and evaporated. The product obtained was dissolved in methanol and precipitated as phosphate salt by treating with phosphoric acid. The precipitate was filtered off.

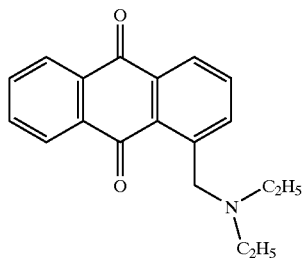

17

Specific Description

1-[Methylamino-N,N-(diethyl)]-9,10-anthraquinone monophosphate (DNA4-39-1) (17)

1-Bromomethylanthraquinone (500 mg) was refluxed for 1 hour with diethylamine (10 ml). Excess diethylamine was removed under vacuum and the products were mixed with ice-cold dilute hydrochloric acid (5%, 200 ml) and extracted with methylene chloride. The aqueous layer was then basified (pH 12) with 20% sodium hydroxide solution and extracted three times with methylene chloride. This extract was washed with water, dried over anhydrous sodium sulfate and evaporated. The product obtained was crystallized from methylene chloride crystalline compound.

MW; m/e 294.1462 (M+H$^+$, $C_{19}H_{20}NO_2$, Cald. 294.1488)

NMR: δ(CDCl$_3$, 300 MHz) 1.08 (6H, t, J=7.0 Hz, N(CH$_2$CH$_3$)$_2$), 2.61 (4H, q, J=7.0 Hz, N(CH$_2$CH$_3$)$_2$), 4.23 (2H, s, 1-CH$_2$), 7.72–7.76 (4H, m, 2,3,6,7-H), 8.25–8.38 (3H, m, 4,5,8-H)

The product obtained was dissolved in methanol and precipitated as phosphate salt by treating with phosphoric acid. The precipitate was filtered off.

Anal. C, 58.54; H, 5.82; N, 3.60; P, 7.76% calcd for $C_{19}H_{19}NO_2 \cdot H_3PO_4$ C, 58.31; H, 5.67; N, 3.58; P, 7.91%

Example 6

Synthesis of 1-amino- analogs of 9,10-anthraquinone

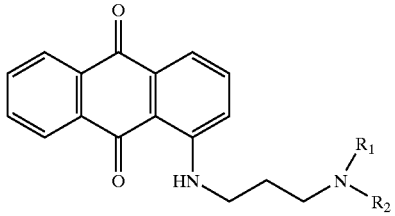

18: $R_1 = CH_2CH_3$, $R_2 = CH_2CH_3$
19: $R_1 = CH_3$, $R_2 = CH_3$

General Procedure

1-Chloroanthraquinone or 1-bromoanthraquinone was heated for 1–2 hours at 100° C. with excess amine in the presence or absence of dimethyl sulfoxide co-solvent. The reaction mixture was cooled and mixed with ice-cold dilute hydrochloric acid and extracted with an organic solvent such as such as diethyl ether, ethyl acetate or methylene chloride. The aqueous layer was then basified with 20% sodium hydroxide solution and extracted with an organic solvent such as diethyl ether, ethyl acetate or methylene chloride. This extract was washed with water, dried over anhydrous sodium sulfate and evaporated. The product obtained was dissolved in methanol and crystallized as phosphate salt by treating with phosphoric acid. The crystalline product was filtered off.

Specific Description

Synthesis of 1-amino-N-(propyl-3'-N,N-diethylamino)-9,10-anthraquinone phosphate (DNA2-91-1) (18)

A mixture of 1-chloroanthraquinone (2 gm) and 3-diethylamino-1-propylamine (10 ml) was heated for 2 hours at 100° C., poured into ice-cold HCl solution (5%, 200 ml) and extracted three times with ether. The aqueous layer was basified (pH 12) with sodium hydroxide solution (10%) and extracted three times with ether. The ether layer was washed with water dried over anhydrous sodium sulfate and evaporated to dryness to give 1-amino-N-(propyl-3'-N,N-diethylamino)-9,10-anthraquinone as a red gum.

HRMS: 336.1872 (M+H$^+$, $C_{21}H_{24}N_2O_2$, Cald. 336.1838)

NMR: δ(CDCl$_3$, 300 MHz) 0.96 (6H, t, J=7.1 Hz, NCH$_2$CH$_3$), 1.57 (2H, quintet, J=6.9 Hz, NHCH$_2$CH$_2$CH$_2$N) 2.47 (6H, q, J=7.1 Hz, NHCH$_2$CH$_2$CH$_2$N(CH$_2$CH$_3$)$_2$), 3.17 (2H, q, J=6.7 Hz, NHCH$_2$CH$_2$CH$_2$N(CH$_2$CH$_3$)$_2$), 6.84 (1H, d, J=8.2 Hz, 2-H), 7.31 (1H, t, J=8.2 Hz, 3-H), 7.37 (1H, d, J=8.1 Hz, 4-H), 7.57 (2H, m, 6, 7-H), 8.07 (2H, m, 5, 8-H), 9.55 (1H, t, NH)

This gum was dissolved in methanol (200 ml) and treated with phosphoric acid (85%, 3 ml) to give 1-(amino-N-propyl-3-N,N-diethylamino)anthraquinone phosphate as a red crystalline compound (1.6 gm).

Anal. C, 57.11; H, 6.45; N, 6.41; P, 7.07% calcd for $C_{21}H_{24}N_2O_2 \cdot H_3PO_4$ C, 58.06; H, 6.26; N, 6.45; P, 7.13%

Synthesis of 1-amino-N-(propyl-3'-N,N-dimethylamino)-9,10-anthraquinone phosphate (DNA2-93-1) (19)

This compound was prepared using 1-chloroanthraquinone and 3-dimethylaminopropylamine as reagents and the same protocol which was used in the preparation of compound 18.

HRMS: 308.1541 (M+H$^+$, $C_{19}H_{20}N_2O_2$, Cald. 308.1525)

NMR: δ(CDCl$_3$, 300 MHz) 1.80 (2H, quintet, J=7 Hz, NHCH$_2$CH$_2$CH$_2$N(CH$_3$)$_2$), 2.20 (6H, s, N(CH$_3$)$_2$), 2.35 (2H, t, J=7.0 Hz, NHCH$_2$CH$_2$CH$_2$N (CH$_3$)$_2$), 3.22 (2H, q, J=6.8 Hz, NHCH$_2$CH$_2$CH$_2$N (CH$_3$)$_2$), 6.89 (1H, d, J=8.2 Hz, 2-H), 7.35 (1H, t, J=8.1 Hz, 3-H), 7.41 (1H, d, J=6.6 Hz, 4-H), 7.60 (2H, m, 6, 7-H), 8.10 (1H, m, 5, 8-H), 9.58 (1H, t, NH)

Anal. C, 55.98; H, 5.84; N, 6.77; P, 7.48% calcd for $C_{19}H_{20}N_2O_2 \cdot H_3PO_4$ C, 56.16; H, 5.70; N, 6.89; P, 7.62%

Example 7

Synthesis of Polyethylene Glycol Derivatives of 1-hydroxy and 2-hydroxy Anthraquinones

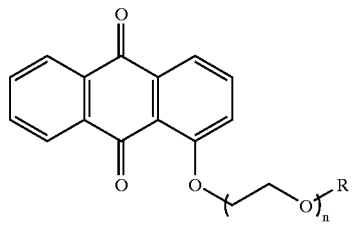

20: n = 4, R = H
22: n = 1, R = CH$_3$
24: n = 2, R = CH$_3$
26: n = 3, R = H
28: n = 3, R = CH$_3$
30: n = 4, R = CH$_3$
32: n = 5, R = H

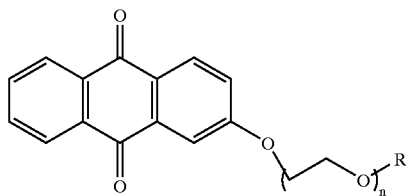

21; n = 3, R = CH$_3$
23: n = 1, R = CH$_3$
25: n = 2, R = CH$_3$
27: n = 3, R = H
29: n = 4, R = H
30: n = 4, R = CH$_3$
31: n = 5, R = H

General Procedure

A mixture of 1-chloroanthraqinone or 2-chloroanthraqinone and equal amount of potassium carbonate in ethylene glycols was heated at 120–140° C. for 3 hours and poured into cold water. The precipitate formed was filtered off, dried and purified by column chromatography on silica gel using a mixture of chloroform and methanol as the solvent. The product was crystallized from chloroform/ether.

Specific Description

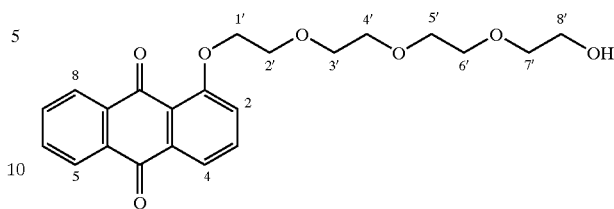

Synthesis of 1-[2-[2-[2-(2-hydroxyethoxy)ethoxy]ethoxy]ethoxy]-9,10-anthraquinone (DNA3-45-1) (20)

A mixture of 1-chloroanthraquinone (4 gm) potassium carbonate, (4 gm) in tetraethyleneglycol (15 ml) was heated for three hours at 120° C., poured into cool water and filtered off. The solid obtained was chromatographed over silica gel and eluted with methylene chloride:methanol (99:1) gave 1-[2-[2-[2-(2-hydroxyethoxy)ethoxy]ethoxy]ethoxy]-9,10-anthraquinone. This compound was crystallized from ether to give a yellow crystalline compound.

HRMS: . . . (M+H$^+$, $C_{22}H_{24}O_7$, Cald. 401.1600)

NMR: δ(CDCl$_3$, 300 MHz) 3.23 (1H, t, J=6.0 Hz, —OH), 3.41(2H, m, 8'-CH$_2$), 3.45–3.56 (8H, m, 4',5',6',7'-CH$_2$), 3.68 (2H, m, 3'-CH$_2$), 3.81 (2H, t, J=4.9 Hz, 2'-CH$_2$), 4.08 (2H, t, J=4.9 Hz, 1'-CH$_2$), 7.12 (1H, br d, J=8.4 Hz, 2-H), 7.42 (1H, br t, J=8.1 Hz, 3-H), 7.51 (2H, m, 6,7-H), 7.64 (1H, dd, J=7.7, 0.7 Hz, 4-H), 7.92 (1H, dd, J=7.6, 1.3 Hz, 8-H) 7.96 (1H, dd, J=7.7, 1.2 Hz, 5-H)

Synthesis of 2-[2-[2-(2-methoxyethoxy)ethoxy]ethoxy]-9,10-anthraquinone (DNA3-9-1) (21)

A mixture of 2-choroanthraquinone (2.5 gm) potassium carbonate (2.5 gm) in triethyleneglycol monomethyl ether (15 ml) was heated for three hours at 140° C., poured into cool water and filtered off. The solid obtained was chromatographed over silica gel and eluted with methylene chloride:methanol (96:4) yielded Synthesis of 2-[2-[2-(2-methoxyethoxy)ethoxy]ethoxy]-9,10-anthraquinone. This compound was crystallized from ether to give yellow crystalline compounds.

HRMS: . . . (M+H$^+$, $C_{21}H_{22}O_6$, Cald. 371.1495)

NMR: δ(CDCl$_3$, 300 MHz) 3.35 (3H, s, —OCH$_3$), 3.53 (2H, m, 6'-CH$_2$), 3.63–3.69 (4H, m, 4',5'-CH$_2$), 3.75 (2H, m, 3'-CH$_2$), 3.91 (2H, t, J=4.7 Hz, 2'-CH$_2$), 4.30 (2H, t, J=4.4 Hz, 1'-CH$_2$), 7.27 (1H, dd, J=8.7, 2.5 Hz, 3-H), 7.70 (1H, d, J=2.5 Hz, 1-H), 7.75 (2H, m, 6,7-H), 8.22 (1H, d, J=8.8 Hz, 4-H), 8.25 (2H, m, 5,8-H)

Chemicals reactants were modified but the same protocol was followed from compounds 20 and 21 to produce compounds 23 through 33.

1-(2-Methoxyethoxy)-9,10-anthraquinone (DNA3-13-1) (22)

This compound was prepared using 1-chloranthraquinone and ethylene glycol monomethyl ether as reagents and the general procedure which was described above to prepare polyethylene glycol derivatives of 1-hydroxy and 2-hydroxyanthraquinones.

HRMS: . . . (M+H$^+$, $C_{17}H_{14}O_4$, Cald. 283.0970)

NMR: δ(CDCl$_3$, 300 MHz) 3.53 (3H, s, —OCH$_3$), 3.91 (2H, t, J=4.9 Hz, 2'-CH$_2$), 4.31 (2H, t, J=4.7 Hz, 1'-CH$_2$), 7.36 (1H, br d, J=8.2 Hz, 2-H), 7.68 (1H, br t, J=8.0 Hz, 3-H), 7.74 (2H, m, 6,7-H), 7.96 (1H, dd, J=7.8, 0.9 Hz, 4-H), 8.21 (1H, dd, J=7.5, 1.5 Hz, 8-H) 8.25 (1H, dd, J=7.3, 1.3 Hz, 5-H)

2-(2-Methoxyethoxy)-9,10-anthraquinone (DNA2-97-1) (23)

This compound was prepared using 2-chloranthraquinone and ethylene glycol monomethyl ether as reagents and the general procedure which was described above to prepare polyethylene glycol derivatives of 1-hydroxy and 2-hydroxyanthraquinones.

HRMS: . . . (M+H$^+$, $C_{17}H_{14}O_4$, Cald. 283.0970)

NMR: δ(CDCl$_3$, 300 MHz) 3.47 (3H, s, —OCH$_3$), 3.82 (2H, t, J=4.5 Hz, 2'-CH$_2$), 4.31 (2H, t, J=4.5 Hz, 1'-CH$_2$), 7.31 (1H, dd, J=8.6, 2.5 Hz, 3-H), 7.73 (1H, d, J=2.5 Hz, 1-H), 7.76 (2H, m, 6,7-H), 8.25 (1H, d, J=8.5 Hz, 4-H), 8.28 (2H, m, 5,8-H)

1-[2-(2-Methoxyethoxy)ethoxy]-9,10-anthraquinone (DNA3-7-1) (24)

This compound was prepared using 1-chloranthraquinone and diethylene glycol monomethyl ether as reagents and the general procedure which was described above to prepare polyethylene glycol derivatives of 1-hydroxy and 2-hydroxyanthraquinones.

HRMS: . . . (M+H$^+$, $C_{19}H_{18}O_5$, Cald. 327.1232)

NMR: δ(CDCl$_3$, 300 MHz) 3.37 (3H, s, —OCH$_3$), 3.59 (2H, m, 4'-CH$_2$), 3.84 (2H, m, 3'-CH$_2$), 4.02 (2H, t, J=5.0 Hz, 2'-CH$_2$), 4.32 (2H, t, J=4.9 Hz, 1'-CH$_2$), 7.34 (1H, br d, J=8.2 Hz, 2-H), 7.66 (1H, br t, J=7.9 Hz, 3-H), 7.72 (2H, m, 6,7-H), 7.94 (1H, dd, J=7.6, 0.6 Hz, 4-H), 8.20 (1H, dd, J=7.6, 1.4 Hz, 8-H) 8.22 (1H, dd, J=7.6, 1.3 Hz, 5-H)

2-[2-(2-Methoxyethoxy)ethoxy]-9,10-anthraquinone (DNA3-5-1) (25)

This compound was prepared using 2-chloranthraquinone and diethylene glycol monomethyl ether as reagents and the general procedure which was described above to prepare polyethylene glycol derivatives of 1-hydroxy and 2-hydroxyanthraquinones.

HRMS: . . . (M+H$^+$, $C_{19}H_{18}O_5$, Cald. 327.1232)

NMR: δ(CDCl$_3$, 300 MHz) 3.37 (3H, s, —OCH$_3$), 3.56 (2H, m, 4'-CH$_2$), 3.72 (2H, m, 3'-CH$_2$), 3.90 (2H, t, J=4.7 Hz, 2'-CH$_2$), 4.30 (2H, t, J=4.6 Hz, 1'-CH$_2$), 7.25 (1H, dd, J=8.6, 2.6 Hz, 3-H), 7.67 (1H, d, J=2.5 Hz, 1-H), 7.73 (2H, m, 6,7-H), 8.19 (1H, d, J=8.8 Hz, 4-H), 8.23 (2H, m, 5,8-H)

1-[2-[2-(2-Hydroxyethoxy)ethoxy]ethoxy]-9,10-anthraquinone (DNA3-15-1) (26)

This compound was prepared using 1-chloranthraquinone and triethylene glycol as reagents and the general procedure which was described above to prepare polyethylene glycol derivatives of 1-hydroxy and 2-hydroxyanthraquinones.

HRMS: . . . (M+H$^+$, $C_{20}H_{20}O_6$, Cald. 357.1338)

NMR: δ(CDCl$_3$, 300 MHz) 2.79 (1H, t, J=6.0 Hz, —OH), 3.61 (2H, m, 6-CH$_2$), 3.69–3.72 (8H, m, 4',5'-CH$_2$), 3.85 (2H, m, 3'-CH$_2$), 4.00 (2H, t, J=4.5 Hz, 2'-CH$_2$), 4.29 (2H, t, J=4.5 Hz, 1'-CH$_2$), 7.31 (1H, br d, J=8.3 Hz, 2-H), 7.63 (1H, br t, J=7.8 Hz, 3-H), 7.70 (2H, m, 6,7-H), 7.91 (1H, brd, J=7.6 Hz, 4-H), 8.17 (1H, dd, J=7.8, 1.3 Hz, 8-H) 8.20 (1H, dd, J=7.4, 1.3 Hz, 5-H)

2-[2-[2-(2-Hydroxyethoxy)ethoxy]ethoxy]-9,10-anthraquinone (DNA2-99-2) (27)

This compound was prepared using 2-chloranthraquinone and triethylene glycol as reagents and the general procedure which was described above to prepare polyethylene glycol derivatives of 1-hydroxy and 2-hydroxyanthraquinones.

HRMS: . . . (M+H$^+$, $C_{20}H_{20}O_6$, Cald. 357.1338)

NMR: δ(CDCl$_3$, 300 MHz) 2.50 (1H, t, J=5.7 Hz, —OH), 3.61 (2H, m, 6'-CH$_2$), 3.66–3.77 (4H, m, 3',4',5'-CH$_2$), 3.91 (2H, t, J=4.6 Hz, 2'-CH$_2$), 4.30 (2H, t, J=4.6 Hz, 1'-CH$_2$), 7.27 (1H, dd, J=8.7, 2.6 Hz, 3-H), 7.69 (1H, d, J=2.6 Hz, 1-H), 7.74 (2H, m, 6,7-H), 8.20 (1H, d, J=8.7 Hz, 4-H), 8.24 (2H, m, 5,8-H)

1-[2-[2-(2-Methoxyethoxy)ethoxy]ethoxy]-9,10-anthraquinone (DNA3-11-1) (28)

This compound was prepared using 1-chloranthraquinone and triethylene glycol monomethyl ether as reagents and the general procedure which was described above to prepare polyethylene glycol derivatives of 1-hydroxy and 2-hydroxyanthraquinones.

HRMS: . . . (M+H$^+$, $C_{21}H_{22}O_6$, Cald. 371.1495)

NMR: δ(CDCl$_3$, 300 MHz) 3.36 (3H, s, —OCH$_3$), 3.54 (2H, m, 4'-CH$_2$), 3.64–3.72 (4H, m, 4',5'-CH$_2$), 3.86 (2H, m, 3'-CH$_2$), 4.03 (2H, t, J=5.0 Hz, 2'-CH$_2$), 4.34 (2H, t, J=4.9 Hz, 1'-CH$_2$), 7.38 (1H, d, J=8.2 Hz, 2-H), 7.66 (1H, br t, J=8 Hz, 3-H), 7.75 (2H, m, 6,7-H), 7.97 (1H, dd, J=7.5, 0.8 Hz, 4-H), 8.23 (1H, dd, J=7.5, 1.6 Hz, 8-H) 8.22 (1H, dd, J=7.5, 1.5 Hz, 5H)

2-[2-[2-[2-(2-Hydroxyethoxy)ethoxy]ethoxy]ethoxy]-9,10-anthraquinone (DNA3-43-1) (29)

This compound was prepared using 2-chloranthraquinone and tetraethylene glycol as reagents and the general procedure which was described above to prepare polyethylene glycol derivatives of 1-hydroxy and 2-hydroxyanthraquinones.

HRMS: . . . . (M+H$^+$, $C_{22}H_{24}O_7$, Cald. 401.1600)

NMR: δ(CDCl$_3$, 300 MHz) 3.02 (1H, s, —OH), 3.49 (2H, m, 8'-CH$_2$), 3.66–3.77 (10H, m, 3',4',5',6',7'-CH$_2$), 3.78 (2H, t, J=4.6 Hz, 2'-CH$_2$), 4.14 (2H, t, J=4.6 Hz, 1'-CH$_2$), 7.07 (1H, dd, J=8.7, 2.6 Hz, 3-H), 7.45 (1H, d, J=2.6 Hz, 1-H), 7.58 (2H, m, 6,7-H), 7.98 (1H, d, J=8.7 Hz, 4-H), 8.03 (2H, m, 5,8-H)

1-[2-[2-[2-(2-Methoxyethoxy)ethoxy]ethoxy]ethoxy]-9,10-anthraquinone (DNA3-53-1) (30)

This compound was prepared using 1-chloranthraquinone and tetraethylene glycol monomethyl ether as reagents and the general procedure which was described above to prepare polyethylene glycol derivatives of 1-hydroxy and 2-hydroxyanthraquinones.

HRMS: . . . (M+H$^+$, $C_{23}H_{26}O_7$, Cald. 415.1757)

NMR: δ(CDCl$_3$, 300 MHz) 3.12 (3H, s, —OCH$_3$), 3.29 (2H, m, 8'-CH$_2$), 3.39–3.51 (8H, m, 4',5',6',7'-CH$_2$), 3.65 (2H, m, 3'-CH$_2$), 3.77 (2H, t, J=4.8 Hz, 2'-CH$_2$), 4.04 (2H, t, J=4.8 Hz, 1'-CH$_2$), 7.07 (1H, br d, J=8.3 Hz, 2-H), 7.38 (1H, br t, J=7.9 Hz, 3-H), 7.47 (2H, m, 6,7-H), 7.59 (1H, br d, J=7.5 Hz, 4-H), 7.88 (1H, br d, J=7.6, 1.4 Hz, 8-H) 7.92 (1H, dd, J=7.6, 1.3 Hz, 5H)

2-[2-[2-[2-(2-Methoxyethoxy)ethoxy]ethoxy]ethoxy]-9,10-anthraquinone (DNA3-55-1) (31)

This compound was prepared using 2-chloranthraquinone and tetraethylene glycol monomethyl ether as reagents and the general procedure which was described above to prepare polyethylene glycol derivatives of 1-hydroxy and 2-hydroxyanthraquinones.

HRMS: ... (M+H$^+$, $C_{23}H_{26}O_7$, Cald. 415.1757)

NMR: δ(CDCl$_3$, 300 MHz) 3.21 (3H, s, —OCH$_3$), 3.39 (2H, m, 8'-CH$_2$), 3.46–3.62 (10H, m, 3',4',5',6',7'-CH$_2$), 3.77 (2H, t, J=4.6 Hz, 2'-CH$_2$), 4.11 (2H, t, J=4.6 Hz, 1'-CH$_2$), 7.04 (1H, dd, J=8.5, 2.6 Hz, 3-H), 7.42 (1H, d, J=2.5 Hz, 1-H), 7.56 (2H, m, 6,7-H), 7.95 (1H, d, J=8.6 Hz, 4-H), 8.01 (2H, m, 5,8-H)

1-[2-[2-[2-[2-(2-Hydroxyethoxy)ethoxy]ethoxy] ethoxy]ethoxy]-9,10-anthraquinone (DNA3-49-1) (32)

This compound was prepared using 1-chloranthraquinone and pentaethylene glycol as reagents and the general procedure which was described above to prepare polyethylene glycol derivatives of 1-hydroxy and 2-hydroxyanthraquinones.

HRMS: ... (M+H$^+$, $C_{24}H_{28}O_8$, Cald. 445.1862)

NMR: δ(CDCl$_3$, 300 MHz) 3.44 (2H, m, 10'-CH$_2$), 3.50–3.58 (12H, m, 4',5',6',7',8',9'-CH$_2$), 3.73 (2H, m, 3'-CH$_2$), 3.88 (2H, t, J=4.9 Hz, 2'-CH$_2$), 4.16 (2H, t, J=4.7 Hz, 1'-CH$_2$), 7.20 (1H, br d, J=8.4 Hz, 2-H), 7.51 (1H, br t, J=8.0 Hz, 3-H), 7.58 (2H, m, 6,7-H), 7.73 (1H, dd, J=7.7, 0.8 Hz, 4-H), 8.01 (1H, dd, J=7.6, 1.4 Hz, 8-H) 8.04 (1H, dd, J=7.8, 1.5 Hz, 5H)

2-[2-[2-[2-[2-(2-Hydroxyethoxy)ethoxy]ethoxy] ethoxy]ethoxy]-9,10-anthraquinone (DNA3-51-1) (33)

This compound was prepared using 2-chloranthraquinone and pentaethylene glycol as reagents and the general procedure which was described above to prepare polyethylene glycol derivatives of 1-hydroxy and 2-hydroxyanthraquinones.

HRMS: ... (M+H$^+$, $C_{24}H_{28}O_8$, Cald. 445.1862)

NMR: δ(CDCl$_3$, 300 MHz) 3.60 (2H, m, 10'-CH$_2$), 3.64–3.77 (14H, m, 3',4',5',6',7',8',9'-CH$_2$), 3.92 (2H, t, J=4.6 Hz, 2'-CH$_2$), 4.32 (2H, t, J=4.6 Hz, 1'-CH$_2$), 7.30 (1H, dd, J=8.6, 2.7 Hz, 3-H), 7.73 (1H, d, J=2.7 Hz, 1-H), 7.77 (2H, m, 6,7-H), 8.25 (1H, d, J=8.6 Hz, 4-H), 8.29 (2H, m, 5,8-H)

EXAMPLE 8

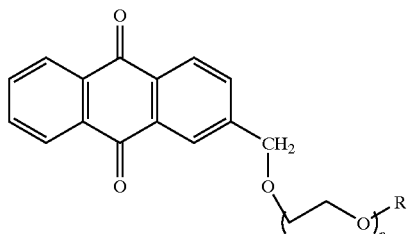

34: n = 3, R = H
35: n = 4, R = H
36: n = 3, R = CH$_3$

Synthesis of Polyethylene Glycol Derivatives of 2-(hydroxymethyl)anthraquinones
General Procedure A mixture of 2-(chloromethyl)anthraqinone and twice the amount of barium hydroxide in poly(eththyleneglycol) was sonicated 10 minutes and then stirred for 3 hours at room temperature. The reaction mixture was poured into cold water and the precipitate formed was filtered off, dried and purified by column chromatography on silica gel using a mixture of hexanes and acetone as the solvent. The product was crystallized from ether/hexanes.

Specific Description

Synthesis of 2-methylene-[2-[2-(2-methoxyethoxy) ethoxy]ethoxy]-9,10-anthraquinone (DNA3-61-1) (36)

A mixture of 2-(chloromethyl)anthraqinone (600 mg) and twice the amount of barium hydroxide (1.2 gm) in trimethylene glycol monomethyl ether was sonicated 10 minutes and then stirred for 3 hours at room temperature. The reaction mixture was poured into cold water and the precipitate formed was filtered off. The solid obtained was purified by column chromatography on silica gel using a mixture of hexanes:acetone 3:1 as the solvent. The product was crystallized from ether/hexanes.

HRMS: ... (M+H$^+$, $C_{22}H_{24}O_6$, Cald. 385.1651)

NMR: δ(CDCl$_3$, 300 MHz) 3.27 (3H, s, —OCH$_3$), 3.46 (2H, m, 6'-CH$_2$), 3.56–3.64 (10H, m, 1',2',3',4',5'-CH$_2$), 4.62 (2H, s, 2-CH$_2$), 7.64–7.70 (3H, m, 3,6,7-H), 8.07–8.14 (4H, m, 1,4,5,8-H)

2-Methylene-[2-[2-(2-hydroxyethoxy)ethoxy] ethoxy]-9,10-anthraquinone (DNA3-57-1) (34)

This compound was prepared using 2-chlormethylanthraquinone and triethylene glycol as reagents and the general procedure which was described above to prepare polyethylene glycol derivatives of 2-(hydroxymethyl) anthraquinones.

HRMS: ... (M+H$^+$, $C_{21}H_{22}O_6$, Cald. 371.1416)

NMR: δ(CDCl$_3$, 300 MHz) 3.59 (2H, m, 6'-CH$_2$), 3.60–3.71 (10H, m, 1', 2',3',4',5'-CH$_2$), 4.67 (2H, s, 2-CH$_2$), 7.65–7.75 (3H, m, 3,6,7-H), 8.17–8.22 (4H, m, 1,4,5,8-H)

2-Methylene-[2-[2-[2-(2-hydroxyethoxy)ethoxy] ethoxy]ethoxy]-9,10-anthraquinone (DNA3-59-1) (35)

This compound was prepared using 2-chlormethylanthraquinone and tetraethylene glycol as reagents and the general procedure which was described above to prepare polyethylene glycol derivatives of 2-(hydroxymethyl)anthraquinones.

HRMS: ... (M+H$^+$, $C_{23}H_{26}O_7$, Cald. 415.1757)

NMR: δ(CDCl$_3$, 300 MHz) 3.60 (2H, m, 6'-CH$_2$), 3.67–3.72 (14H, m, 1',2,',3',4',5',6',7'-CH$_2$), 4.73 (2H, s, 2-CH$_2$), 7.75–7.85 (3H, m, 3,6,7-H), 8.24–8.32 (4H, m, 1,4,5,8-H)

Laboratory Tests
Laboratory Screening of Anthraquinone Derivatives

The anthraquinone derivatives were screened for selective toxicity towards *Oscillatoria perornata*, previously isolated from a Mississippi catfish pond, using the method of Schrader et al. (1997). The green alga *Selenastrum capricornutum* (obtained from the United States Environmental Protection Agency, Corvallis, Oreg.) was used as the representative green algal species in the bioassay since it is a common species found in southeastern United States catfish ponds. Absorbance readings were graphed, and graphs were used to determine the LOEC (lowest-observed-effect concentration) and the LCIC (lowest-complete-inhibition concentration) for each anthraquinone analog. In addition, a 96-hour 50% inhibition concentration (IC50) was determined for DNA1-19-1 and DNA2-59-1 by using the method described by Schrader et al. (1998b). Stock solutions of DNA1-19-1 and DNA2-59-1 were prepared so that final concentrations screened for 96-hour IC50 determinations were as follows: 1) 0, 0.01, 0.033, 0.1, 0.333, 1.0, 3.3, and 10.0 µM DNA1-19-1 for both *O. perornata* and *S. capricornutum;* 2) 0, 0.003, 0.01, 0.033, 0.1, 0.333, 1.0, and 3.333 µM DNA2-59-1 for *O. perornata*; and 3) 0, 0.1, 0.333, 1.0, 3.333, 10.0, 33.333, and 100.0 µM DNA2-59-1 for *S. capricornutum*. Estimation of the IC50 was determined by plotting 96-hour absorbance readings against logarithmic dilution values of the anthraquinone analogs. The screening results of the anthraquinone derivatives and commercially available analogs of anthraquinone are presented in Tables 1 and 2, respectively. Results of the IC50 determinations are presented in Table 3. The results in Table 1 reveal that DNA1-19-1 and DNA2-59-1 are the most promising analogs since these two compounds had the lowest LOEC and LCIC values for *O. perornata* (10 nM and 100 nM, respectively). Based upon IC50 results in Table 3, DNA2-59-1 appears to be more toxic and selective towards *O. perornata* than DNA1-19-1. Both DNA1-19-1 and DNA2-59-1 are very selectively toxic towards *O. perornata* compared to *S. capricornutum*.

The method described by Schrader et al. (2000) was used to determine the potential for using the anthraquinone derivatives as selective algicides in catfish aquaculture ponds. All catfish ponds used in efficacy tests were maintained using commercial pond management practices and were located at the Thad Cochran Pond Facility, Mississippi State University, Stoneville, Miss. Anthraquinone analogs were dissolved in deionized water before application to water within the limnocorrals.

Limnocorrals in which test compound was applied to the enclosed water were randomly selected, and control (no test compound applied) limnocorrals were included in each efficacy study. For each sampling, two water samples (250 mL) were obtained from within each limnocorral (approximately 6–8 cm below the water surface and from opposite sides of each limnocorral) and mixed together in a 500 mL sample bottle to provide a representative sample of the water contained within the limnocorral.

EXAMPLE 9

Efficacy Testing of DNA1-19-1

Three pond efficacy studies were conducted with DNA1-19-1. In the first study, six limnocorrals (open-ended fiberglass cylinders, 2.44 m in diameter and 1.53 m high; Solar Components Corporation, Manchester, N.H.) were placed in a 4-ha earthen catfish pond. The pond was chosen due to the presence of a bloom of *O. perornata*. The water within each limnocorral received mixing in the same manner as used by Schrader et al. (2000). Three randomly selected limnocorrals were used as treatments (received DNA1-19-1), and the other three limnocorrals were controls. Water samples were taken before application of DNA1-19-1 (2 µM or 1,148 µg/L/enclosure), 16 hours after application, and at days 3, 8, and 10. Water samples were analyzed for chlorophyll a by the chloroform-methanol extraction method followed by spectroscopy (S. W. Lloyd and C. S. Tucker, Comparison of three solvent systems for extraction of chlorophyll a from fish pond phytoplankton communities, J. World Aquacult. Soc. (1988), vol. 19, pp. 36–40), phytoplankton community structure and enumeration (American Public Health Association, American Water-Works Association, and Water Pollution Control Federation, Standard Methods for the Examination of Water and Wastewater, $18^{th}$ Edition. APHA, Washington, D.C. (1992)), and for geosmin and MIB levels using solid phase microextraction with gas chromatography-mass spectrometry (SPME-GC-MS) (Lloyd et al., J. M. Lea, P. V. Zimba and C. C. Grimm, Rapid analysis of geosmin and 2-methylisoborneol in water using solid-phase microextraction procedures. Water Res. (1998), vol. 32, pp. 2140–2146). To perform phytoplankton identification and enumeration, water samples were processed by preserving 50-mL subsamples with Lugol's solution and storing them at 4° C. until they could be identified and counted as "natural units" (i.e., colonies, filaments, or unialgal cells) using a Sedgewick-Rafter counting chamber at 300× magnification. Eukaryotic algae were identified to the genus level and filamentous cyanobacteria to the species.

EXAMPLE 10

In the second study with DNA1-19-1, twelve limnocorrals that were the same size as those used in the first study were placed in another 4-ha earthen catfish pond. The pond also had a bloom of *O. perornata*. Randomly selected limnocorrals were used as follows: 1) three controls; 2) three received DNA1-19-1 at an application rate of 1 µM (574 µg/L) per enclosure; 3) three received DNA1-19-1 at an application rate of 0.3 µM (191 mg/L) per enclosure; and 4) three received DNA1-19-1 at an application rate of 0.1 µM (57.4 µg/L) per enclosure. The sampling regime and procedures used in the first study were followed in a similar manner, except that water samples were obtained before DNA1-19-1 application, 16 hours after application, and at days 2, 4, and 7.

Example 11

The third study with DNA1-19-1 essentially duplicated the second study (Example 10) in time. The same pond containing a bloom of *O. perornata*, the same procedures, and the same conditions used in the second study were used again.

Results of Examples 9–11

Chlorophyll a levels decreased significantly within 24 hours with an application rate of 2 µM of DNA1-19-1 to pond water contained within the limnocorrals (see data of Table 1).

TABLE 1

First efficacy study of the effect of DNA1-19-1 on chlorophyll a levels in pond water. Each point is the mean ± standard deviation of the mean of measurements in three replicate limnocorrals. Means on the same day with the same letter are not significantly different (P < 0.05) based upon LSD values.

| Time (days) | Chlorophyll a Levels (mg/L) in Control Limnocorrals | Chlorophyll a Levels (mg/L) in Treatment Limnocorrals |
|---|---|---|
| 0 | $370.3^a$ ± 16.8 | $365.7^a$ ± 16.9 |
| 0.7 | $441.8^a$ ± 12.0 | $160.2^b$ ± 5.3 |
| 3.0 | $416.2^a$ ± 75.5 | $237.6^b$ ± 25.2 |
| 8.0 | $248.2^a$ ± 144.4 | $526.2^a$ ± 157.3 |
| 10.0 | $139.0^a$ ± 77.4 | $368.7^b$ ± 94.9 |

Numbers of filaments of *O. perornata* were significantly reduced by application of 2 µM DNA1-19-1, but numbers then began to increase within 3 days (see data of Table 2).

TABLE 2

First efficacy study of the effect of DNA1-19-1 on the abundance of *Oscillatoria perornata* in pond water. Each point is the mean ± standard deviation of the mean of measurements in three replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
|---|---|---|
| 0 | 3,547$^a$ ± 49.9 | 4,556$^a$ ± 519.8 |
| 0.7 | 4,383$^a$ ± 472.0 | 980$^b$ ± 115.3 |
| 3.0 | 5,997$^a$ ± 550.1 | 1,961$^b$ ± 708.6 |
| 8.0 | 5,709$^a$ ± 915.4 | 3,172$^a$ ± 1,592.9 |
| 10.0 | 4,267$^a$ ± 1,363.4 | 3,575$^a$ ± 1798.8 |

Levels of MIB were also significantly reduced from 15,250 ng/mL (ppb) to near 970 ng/mL and remained much lower than MIB levels in the controls for 8 days (see data of Table 3).

TABLE 3

First efficacy study of the effect of DNA1-19-1 on 2-methylisoborneol levels in pond water. Each point is the mean ± standard deviation of the mean of measurements in three replicate limnocorrals. Means on the same day with the same letter are not significantly different (P < 0.05) based upon LSD values.

| Time (days) | MIB$^a$ Levels (mg/L) in Control Limnocorrals | MIB$^a$ Levels (mg/L) in Treatment Limnocorrals |
|---|---|---|
| 0 | 14.73$^a$ ± 1.86 | 15.25$^a$ ± 3.43 |
| 0.7 | 20.16$^a$ ± 2.55 | 0.97$^b$ ± 0.19 |
| 3.0 | 40.75$^a$ ± 7.80 | 4.56$^b$ ± 1.87 |
| 8.0 | 4.01$^a$ ± 4.01 | 0.55$^b$ ± 0.33 |
| 10.0 | 9.03$^a$ ± 3.78 | 5.46$^a$ ± 5.26 |

MIB$^a$ = 2-methylisoborneol

Numbers of green algae (Division Chlorophyta) in controls and in limnocorrals treated with 2 µM DNA1-19-1 were not significantly different based upon Least Significant Difference (LSD) values until 10 days after application of DNA1-19-1 (see data of Table 4).

TABLE 4

First efficacy study of the effect of DNA1-19-1 on the abundance of green algae in pond water. Each point is the mean ± standard deviation of the mean of measurements in three replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
|---|---|---|
| 0 | 1,298$^a$ ± 264 | 2,047$^a$ ± 126 |
| 0.7 | 750$^a$ ± 115 | 1,845$^a$ ± 251 |
| 3.0 | 692$^a$ ± 264 | 346$^a$ ± 173 |
| 8.0 | 577$^a$ ± 231 | 115$^a$ ± 115 |
| 10.0 | 577$^a$ ± 153 | 0$^b$ ± 0 |

The most common genera of green algae observed in pond water samples obtained during the three efficacy studies of DNA1-19-1 were *Actinastrum*, *Ankistrodesmus*, *Closterium*, *Coelastrum*, *Crucigenia*, *Oocystis*, *Pediastrum*, *Scenedesmus*, *Schroederia*, and *Staurastrum*.

Results of the second and third efficacy study of DNA1-19-1 revealed a lack of reduction of chlorophyll a levels, numbers of *O. perornata* filaments, and 2-methylisoborneol levels compared to controls at application rates of 1, 0.3, and 0.1 µM. Therefore, DNA1-19-1 is effective in selectively reducing numbers of *O. perornata* and MIB levels in pond water when applied at 2 µM, but not at application rates of 1 µM, 0.3 µM, or 0.1 µM.

Efficacy Testing of DNA2-59-1

Three efficacy tests were performed using DNA2-59-1. The following examples indicate various aspects of DNA2-59-1 according to the invention.

EXAMPLE 12

In the first study, application rates of 0.1 µM (37.7 µg/L), 0.3 µM (125 µg/L), and 1.0 µM (377 µg/L) of DNA2-59-1 were tested using limnocorrals (three replicates per concentration) that were of the same type used for testing DNA1-19-1. Three limnocorrals were used as controls. These limnocorrals were set up in a 3.3-ha earthen pond that had *O. perornata* and *Anabaena circinalis* (geosmin producer) present. Water within each limnocorral was not mixed by aeration (using airstones; see Schrader et al., 2000) until the day after the limnocorrals were placed in the pond. This delay in mixing was to permit suspended sediment and organic matter to settle to the pond bottom. The chemical nature of DNA2-59-1 is such that it has less of a positive charge than DNA1-19-1, and, therefore, DNA2-59-1 is less likely than DNA1-19-1 to bind to suspended sediment and organic matter, subsequently permitting a greater availability of DNA2-59-1 in the water column for uptake by phytoplankton. Approximately 30 minutes after mixing the water within each limnocorral, randomly selected treatment limnocorrals received the appropriate amounts of DNA2-59-1. Water samples were collected before application of the test compound, 20 minutes after application (for anthraquinone level determination by HPLC), and 24 hours after application. This study proceeded for only one day since a thunderstorm disrupted the circular shape and integrity of the limnocorrals; however, due to the rapid toxicity of DNA2-59-1 towards *O. perornata*, positive results were observed 24 hours after the initial treatment and a determination of dose-response results was made. The same tests and analytical procedures performed on water samples taken during the efficacy testing of DNA1-19-1 were used in the three efficacy tests undertaken with DNA2-59-1. Water samples were also analyzed to determine the persistence of DNA2-59-1 in the pond water, and this analysis was performed by using high-pressure liquid chromatography (HPLC) (method and results are described later).

Chlorophyll a levels were significantly reduced by application of DNA2-59-1 at 1 and 0.3 µM, but not at 0.1 µM compared to the controls (see data of Table 5).

TABLE 5

First efficacy study of the effect of DNA2-59-1 on chlorophyll a levels in pond water. Each point is the mean ± standard deviation of the mean of measurements in three replicate limnocorrals. Means on the same day with the same letter are not significantly different (P < 0.05) based upon LSD values.

| Time (day) | Chlorophyll a (mg/L) in Control Limnocorrals | Chlorophyll a (mg/L) in Treatment (37.7 ppb) Limnocorrals | Chlorophyll a (mg/L) in Treatment (125.7 ppb) Limnocorrals | Chlorophyll a (mg/L) in Treatment (377 ppb) Limnocorrals |
|---|---|---|---|---|
| 0 | 102.5$^a$ ± 2.5 | 97.2$^a$ ± 1.2 | 99.9$^a$ ± 1.6 | 95.5$^a$ ± 3.2 |
| 0.7 | 111.3$^a$ ± 4.2 | 98.6$^a$ ± 2.7 | 54.1$^b$ ± 0.8 | 46.2$^c$ ± 0.8 |

Application rates of 0.1, 0.3 and 1 μM DNA2-59-1 significantly reduced numbers of *O. perornata* filaments compared to controls (see data of Table 6).

TABLE 6

First efficacy study of the effect of DNA2-59-1 on the abundance of *Oscillatoria perornata* in pond water. Each point is the mean ± standard deviation of the mean of measurements in three replicate limnocorrals. Means on the same day with the same letter are not significantly different (P < 0.05) based upon LSD values.

| Time (day) | Filaments/mL in Control Limnocorrals | Filaments/mL in Treatment (37.7 ppb) Limnocorrals | Filaments/mL in Treatment (125.7 ppb) Limnocorrals | Filaments/mL in Treatment (377 ppb) Limnocorrals |
|---|---|---|---|---|
| 0 | $2,595^a \pm 300$ | $2,941^a \pm 173$ | $3,056^a \pm 416$ | $2,076^a \pm 100$ |
| 0.7 | $3,056^a \pm 58$ | $2,076^b \pm 300$ | $1,442^b \pm 404$ | $1,326^b \pm 58$ |

Levels of MIB decreased in all of the treatments and controls, but to a greater degree and significantly more in limnocorrals receiving applications of 0.3 and 1 μM DNA2-59-1 compared to the controls and limnocorrals receiving applications of 0.1 μM DNA2-59-1 (see data of Table 7).

TABLE 7

First efficacy study of the effect of DNA2-59-1 on 2-methylisoborneol levels in pond water. Each point is the mean ± standard deviation of the mean of measurements in three replicate limnocorrals. Means on the same day with the same letter are not significantly different (P < 0.05) based upon LSD values.

| Time (day) | MIB Levels (ng/L) in Control Limnocorrals | MIB Levels (ng/L) in Treatment (37.7 ppb) Limnocorrals | MIB Levels (ng/L) in Treatment (125.7 ppb) Limnocorrals | MIB Levels (ng/L) in Treatment (377 ppb) Limnocorrals |
|---|---|---|---|---|
| 0 | $2,422^a \pm 238$ | $2,249^a \pm 39$ | $2,581^a \pm 133$ | $2,470^a \pm 146$ |
| 0.7 | $1,568^a \pm 385$ | $1,402^a \pm 113$ | $535^b \pm 58$ | $892^c \pm 128$ |

Geosmin levels also decreased in all of the treatments and controls, but to a greater degree and significantly more in limnocorrals receiving 1 μM DNA2-59-1 compared to the controls and limnocorrals receiving applications of 0.1 and 0.3 μM DNA2-59-1 (see data of Table 8).

TABLE 8

First efficacy study of the effect of DNA2-59-1 on geosmin levels in pond water. Each point is the mean ± standard deviation of the mean of measurements in three replicate limnocorrals. Means on the same day with the same letter are not significantly different (P < 0.05) based upon LSD values.

| Time (day) | Geosmin Levels (ng/L) in Control Limnocorrals | Geosmin Levels (ng/L) in Treatment (37.7 ppb) Limnocorrals | Geosmin Levels (ng/L) in Treatment (125.7 ppb) Limnocorrals | Geosmin Levels (ng/L) in Treatment (377 ppb) Limnocorrals |
|---|---|---|---|---|
| 0 | $258^a \pm 53$ | $208^a \pm 47$ | $317^a \pm 5$ | $286^a \pm 41$ |
| 0.7 | $80^a \pm 9$ | $101^b \pm 23$ | $77^a \pm 8$ | $44^c \pm 7$ |

Numbers of *Anabaena circinalis* were significantly reduced in limnocorrals receiving 1 μM DNA2-59-1 compared to the controls and limnocorrals receiving applications of 0.1 and 0.3 μM DNA2-59-1 (see data of Table 9).

TABLE 9

First efficacy study of the effect of DNA2-59-1 on the abundance of *Anabaena circinalis* in pond water. Each point is the mean ± standard deviation of the mean of measurements in three replicate limnocorrals. Means on the same day with the same letter are not significantly different (P < 0.05) based upon LSD values.

| Time (day) | Filaments/mL in Control Limnocorrals | Filaments/mL in Treatment (37.7 ppb) Limnocorrals | Filaments/mL in Treatment (125.7 ppb) Limnocorrals | Filaments/mL in Treatment (377 ppb) Limnocorrals |
|---|---|---|---|---|
| 0 | $980^a \pm 264$ | $807^a \pm 200$ | $1,211^a \pm 173$ | $1,384^a \pm 624$ |
| 0.7 | $1,038^a \pm 346$ | $865^a \pm 519$ | $634^a \pm 360$ | $0^b \pm 0$ |

In fact, in water samples from limnocorrals receiving 1 μM DNA2-59-1, no filaments of *A. circinalis* were observed to be present 16 hours after application of 1 μM DNA2-59-1. This first efficacy study was the only one of the three conducted with applications of DNA2-59-1 in which geosmin was determined to be present in the pond water. Numbers of green algae were not significantly affected by applications of DNA2-59-1 at 0.1, 0.3 and 1 μM compared to the controls (see data of Table 10).

TABLE 10

First efficacy study of the effect of DNA2-59-1 on the abundance of green algae in pond water. Each point is the mean ± standard deviation of the mean of measurements in three replicate limnocorrals. Means on the same day with the same letter are not significantly different (P < 0.05) based upon LSD values.

| Time (day) | Natural Units/mL in Control Limnocorrals | Natural Units/mL in Treatment (37.7 ppb) Limnocorrals | Natural Units/mL in Treatment (125.7 ppb) Limnocorrals | Natural Units/mL in Treatment (377 ppb) Limnocorrals |
|---|---|---|---|---|
| 0 | $1,326^a \pm 264$ | $1,442^a \pm 264$ | $1,326^a \pm 953$ | $923^a \pm 360$ |
| 0.7 | $1,788^a \pm 360$ | $2,018^a \pm 200$ | $1,384^a \pm 300$ | $1,269^a \pm 818$ |

The most common genera of green algae observed in pond water samples taken during the three efficacy tests of DNA2-59-1 were *Actinastrum, Ankistrodesmus, Closterium, Coelastrum, Crucigenia, Kirchneriella, Dictyosphaerium, Oocystis, Pediastrum, Scenedesmus, Schroederia, Snowella,* and *Staurastrum.*

EXAMPLE 13

In the second efficacy test with DNA2-59-1, six limnocorrals (1.53 m in diameter and 1.53 m high) were placed in a 0.1-ha earthen pond containing a heavy bloom of *O. perornata*. The same delay in mixing the water within the limnocorrals used in the first efficacy study was utilized. Water within three randomly selected limnocorrals received an application rate of 0.3 μM DNA2-59-1, and the other three limnocorrals were controls. Water samples were collected before application of DNA2-59-1, 20 minutes after application, and at days 1, 2, 3, and 7. The same tests and methods used in the first efficacy testing of DNA2-59-1 were used.

Chlorophyll a levels were significantly lower in pond water within limnocorrals receiving application of 0.3 μM DNA2-59-1 for three days after application (see data of Table 11).

TABLE 11

Second efficacy study of the effect of DNA2-59-1 on chlorophyll a levels in pond water. Each point is the mean ± standard deviation of the mean of measurements in three replicate limnocorrals. Means on the same day with the same letter are not significantly different (P < 0.05) based upon LSD values.

| Time (days) | Chlorophyll a Levels (mg/L) in Control Limnocorrals | Chlorophyll a Levels (mg/L) in Treatment Limnocorrals |
| --- | --- | --- |
| 0 | 549.1$^a$ ± 29.1 | 538.6$^a$ ± 19.1 |
| 1 | 798.2$^a$ ± 52.7 | 588.7$^b$ ± 20.2 |
| 2 | 932.8$^a$ ± 55.1 | 638.9$^b$ ± 21.2 |
| 3 | 1,013.8$^b$ ± 40.1 | 733.0$^b$ ± 36.8 |
| 7 | 896.7$^a$ ± 61.7 | 709.3$^a$ ± 37.8 |

Numbers of *O. perornata* and *Raphidiopsis brookii* were significantly and dramatically reduced within three days of application of 0.3 μM DNA2-59-1 (see data of Tables 12 and 13, respectively).

TABLE 12

Second efficacy study of the effect of DNA2-59-1 on the abundance of *Oscillatoria perornata* in pond water. Each point is the mean ± standard deviation of the mean of measurements in three replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
| --- | --- | --- |
| 0 | 2,480$^a$ ± 321 | 2,480$^a$ ± 634 |
| 1 | 2,595$^a$ ± 173 | 1,615$^a$ ± 404 |
| 2 | 2,653$^a$ ± 321 | 1,442$^a$ ± 351 |
| 3 | 3,345$^a$ ± 416 | 923$^b$ ± 208 |
| 7 | 2,999$^a$ ± 610 | 1,096$^a$ ± 416 |

TABLE 13

Second efficacy study of the effect of DNA2-59-1 on the abundance of *Raphidiopsis brookii* in pond water. Each point is the mean ± standard deviation of the mean of measurements in three replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
| --- | --- | --- |
| 0 | 7,093$^a$ ± 173 | 7,036$^a$ ± 896 |
| 1 | 6,920$^a$ ± 793 | 3,748$^b$ ± 378 |
| 2 | 7,324$^a$ ± 642 | 750$^b$ ± 305 |
| 3 | 7,555$^a$ ± 611 | 58$^b$ ± 58 |
| 7 | 8,420$^a$ ± 2,192 | 231$^b$ ± 58 |

Levels of MIB were significantly reduced after three days application of 0.3 μM DNA2-59-1 (see data of Table 14).

TABLE 14

Second efficacy study of the effect of DNA2-59-1 on 2-methylisoborneol levels in pond water. Each point is the mean ± standard deviation of the mean of measurements in three replicate limnocorrals. Means on the same day with the same letter are not significantly different (P < 0.05) based upon LSD values.

| Time (days) | MIB Levels (ng/L) in Control Limnocorrals | MIB Levels (ng/L) in Treatment Limnocorrals |
| --- | --- | --- |
| 0 | 751$^a$ ± 33.1 | 574$^a$ ± 55.3 |
| 1 | 723$^a$ ± 156.5 | 330$^a$ ± 59.8 |
| 2 | 1,092$^a$ ± 348.3 | 243$^a$ ± 97.7 |
| 3 | 1,437$^a$ ± 509.2 | 216$^b$ ± 89.9 |
| 7 | 644$^a$ ± 25.5 | 412$^a$ ± 204.6 |

Numbers of *Oscillatoria geminata* were also reduced by application of 0.3 μM DNA2-59-1, though not significantly (see data of Table 15).

TABLE 15

Second efficacy study of the effect of DNA2-59-1 on the abundance of *Oscillatoria geminata* in pond water. Each point is the mean ± standard deviation of the mean of measurements in three replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
| --- | --- | --- |
| 0 | 692$^a$ ± 346 | 519$^a$ ± 100 |
| 1 | 577$^a$ ± 153 | 231$^a$ ± 231 |
| 2 | 577$^a$ ± 321 | 115$^a$ ± 58 |
| 3 | 231$^a$ ± 115 | 173$^a$ ± 173 |
| 7 | 115$^a$ ± 115 | 115$^a$ ± 115 |

Numbers of *Oscillatoria agardhii* were not affected by application of 0.3 μM DNA2-59-1 (see data of Table 16).

TABLE 16

Second efficacy study of the effect of DNA2-59-1 on the abundance of *Oscillatoria agardhii* in pond water. Each point is the mean ± standard deviation of the mean of measurements in three replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
| --- | --- | --- |
| 0 | 17,878$^a$ ± 1,020 | 15,398$^a$ ± 699 |
| 1 | 21,569$^a$ ± 2,598 | 19,146$^a$ ± 838 |
| 2 | 25,144$^a$ ± 873 | 23,298$^a$ ± 472 |
| 3 | 28,432$^a$ ± 416 | 27,624$^a$ ± 1,912 |
| 7 | 23,991$^a$ ± 4,574 | 28,893$^a$ ± 2,473 |

Neither *O. geminata* nor *O. agardhii* have been linked to off-flavor compound production. Green algae and diatoms (division Chromophyta, class Bacillariophyceae) were not significantly affected by applications of 0.3 μM DNA2-59-1 (see data of Tables 17 and 18, respectively).

TABLE 17

Second efficacy study of the effect of DNA2-59-1 on the abundance of green algae in pond water. Each point is the mean ± standard deviation of the mean of measurements in three replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
| --- | --- | --- |
| 0 | 11,187$^a$ ± 665 | 11,649$^a$ ± 1,096 |
| 1 | 14,878$^a$ ± 780 | 11,764$^a$ ± 1,057 |

TABLE 17-continued

Second efficacy study of the effect of DNA2-59-1 on the abundance of green algae in pond water. Each point is the mean ± standard deviation of the mean of measurements in three replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
|---|---|---|
| 2 | 16,781$^a$ ± 1,995 | 12,514$^a$ ± 1,000 |
| 3 | 13,321$^a$ ± 1,644 | 8,881$^a$ ± 1,068 |
| 7 | 13,436$^a$ ± 1,906 | 10,322$^a$ ± 208 |

TABLE 18

Second efficacy study of the effect of DNA2-59-1 on the abundance of diatoms in pond water. Each point is the mean ± standard deviation of the mean of measurements in three replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
|---|---|---|
| 0 | 6,805$^a$ ± 1,496 | 6,055$^a$ ± 499 |
| 1 | 7,381$^a$ ± 807 | 6,401$^a$ ± 300 |
| 2 | 5,248$^a$ ± 153 | 5,075$^a$ ± 305 |
| 3 | 4,959$^a$ ± 665 | 4,902$^a$ ± 602 |
| 7 | 2,652$^a$ ± 321 | 3,575$^a$ ± 305 |

EXAMPLE 14

For the third efficacy test with DNA2-59-1, twelve limnocorrals (2.44 m in diameter and 1.53 m high) were placed in a 4-ha earthen pond containing a bloom of *O. perornata*. The same procedures, application rate (0.3 μM), and methods used in the second efficacy test of DNA2-59-1 were used except six limnocorrals were randomly selected to receive an application rate of 0.3 μM DNA2-59-1 while the other six limnocorrals were controls. Water samples were collected before application of DNA2-59-1, 20 minutes after application, and at days 1, 2, 3, 4, and 7. The same tests and methods used in the first efficacy testing of DNA2-59-1 were used.

Chlorophyll a levels in the pond water within treatment limnocorrals were significantly reduced 24 hours after application of 0.3 μM DNA2-59-1 (see data of Table 19).

TABLE 19

Third efficacy study of the effect of DNA2-59-1 on chlorophyll a levels in pond water. Each point is the mean ± standard mean of measurements in six replicate limnocorrals. Means on the same day with the same letter are not significantly different (P < 0.05) based upon LSD values.

| Time (days) | Chlorophyll a Levels (mg/L) in Control Limnocorrals | Chlorophyll a Levels (mg/L) in Treatment Limnocorrals |
|---|---|---|
| 0 | 549.1$^a$ ± 7.9 | 556.6$^a$ ± 4.9 |
| 1 | 617.8$^a$ ± 5.7 | 219.6$^b$ ± 14.6 |
| 2 | 646.8$^a$ ± 10.9 | 72.6$^b$ ± 0.9 |
| 3 | 697.4$^a$ ± 5.5 | 191.0$^b$ ± 6.4 |
| 4 | 768.7$^a$ ± 11.1 | 631.8$^b$ ± 52.3 |
| 7 | 946.0$^a$ ± 20.9 | 942.0$^a$ ± 54.1 |

Numbers of *O. perornata* were significantly reduced within 24 hours after application of 0.3 μM DNA2-59-1 (see data of Table 20).

TABLE 20

Third efficacy study of the effect of DNA2-59-1 on the abundance of *Oscillatoria perornata* in pond water. Each point is the mean ± standard deviation of the mean of measurements in six replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
|---|---|---|
| 0 | 1,355$^a$ ± 113 | 1,845$^a$ ± 193 |
| 1 | 2,249$^a$ ± 357 | 58$^b$ ± 58 |
| 2 | 2,652$^a$ ± 305 | 346$^b$ ± 63 |
| 3 | 2,018$^a$ ± 288 | 461$^b$ ± 198 |
| 4 | 3,460$^a$ ± 473 | 317$^b$ ± 83 |
| 7 | 1,499$^a$ ± 406 | 461$^b$ ± 115 |

Levels of 2-methylisoborneol were significantly reduced 24 hours after application of 0.3 μM DNA2-59-1 (see data of Table 21).

TABLE 21

Third efficacy study of the effect of DNA2-59-1 on 2-methylisoborneol levels in pond water. Each point is the mean ± standard deviation of the mean of measurements in six replicate limnocorrals. Means on the same day with the same letter are not significantly different (P < 0.05) based upon LSD values.

| Time (days) | MIB Levels (ng/L) in Control Limnocorrals | MIB Levels (ng/L) in Treatment Limnocorrals |
|---|---|---|
| 0 | 1,525$^a$ ± 99 | 1,515$^a$ ± 83 |
| 1 | 1,192$^a$ ± 69 | 677$^b$ ± 57 |
| 2 | 1,318$^a$ ± 96 | 93$^b$ ± 24 |
| 3 | 1,784$^a$ ± 285 | 163$^b$ ± 42 |
| 4 | 2,123$^a$ ± 112 | 483$^b$ ± 100 |
| 7 | 693$^a$ ± 99 | 653$^a$ ± 170 |

Numbers of *Raphidiopsis brookii* and *Cylindrospermopsis* spp. were significantly reduced one day after application of 0.3 μM DNA2-59-1 (see data of Tables 22 and 23, respectively).

TABLE 22

Third efficacy study of the effect of DNA2-59-1 on the abundance of *Raphidiopsis brookii* in pond water. Each point is the mean ± standard deviation of the mean of measurements in six replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
|---|---|---|
| 0 | 122,116$^a$ ± 5,426 | 11,903$^a$ ± 6,295 |
| 1 | 107,180$^a$ ± 5,738 | 6,286$^b$ ± 935 |
| 2 | 11,113$^a$ ± 3,676 | 807$^b$ ± 139 |
| 3 | 119,896$^a$ ± 3,852 | 1,038$^b$ ± 260 |
| 4 | 118,743$^a$ ± 6,115 | 692$^b$ ± 257 |
| 7 | 139,908$^a$ ± 7,661 | 10,495$^b$ ± 7,909 |

TABLE 23

Third efficacy study of the effect of DNA2-59-1 on the abundance of Cylindrospermopsis spp. in pond water. Each point is the mean ± standard deviation of the mean of measurements in six replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
|---|---|---|
| 0 | 27,451$^a$ ± 5,063 | 30,795$^a$ ± 5,158 |
| 1 | 35,755$^a$ ± 4,387 | 7,526$^b$ ± 799 |
| 2 | 52,427$^a$ ± 3,788 | 231$^b$ ± 106 |
| 3 | 47,809$^a$ ± 4,217 | 404$^b$ ± 73 |
| 4 | 66,321$^a$ ± 11,420 | 317$^b$ ± 83 |
| 7 | 59,804$^a$ ± 6,629 | 565$^b$ ± 243 |

The abundance of *Oscillatoria geminate* in pond water within limnocorrals receiving 0.3 μM DNA2-59-1 remained lower than in the control limnocorrals for four days after application and were significantly lower than controls from two days through four days after application (see data of Table 24).

TABLE 24

Third efficacy study of the effect of DNA2-59-1 on the abundance of *Oscillatoria geminata* in pond water. Each point is the mean ± standard deviation of the mean of measurements in six replicate limnocorrals. Means on the same day with the same letter are not significantly different (P < 0.05) based upon LSD values.

| Time (days) | Filaments/mL in Control Limnocorrals | Filaments/mL in Treatment Limnocorrals |
|---|---|---|
| 0 | 2,912[a] ± 375 | 2,018[a] ± 478 |
| 1 | 1,038[a] ± 334 | 490[a] ± 192 |
| 2 | 2,941[a] ± 788 | 404[b] ± 106 |
| 3 | 3,345[a] ± 746 | 692[b] ± 219 |
| 4 | 5,248[a] ± 1,183 | 1,644[b] ± 282 |
| 7 | 2,191[a] ± 1,139 | 6,921[b] ± 1,431 |

Numbers of *Oscillatoria agardhii* were significantly reduced by application of 0.3 μM DNA2-59-1 while *Microcystis* spp. were not greatly affected in pond water within limnocorrals receiving 0.3 μM DNA2-59-1 compared to the control limnocorrals (see data of Tables 25 and 26, respectively).

TABLE 25

Third efficacy study of the effect of DNA2-59-1 on the abundance of *Oscillatoria agardhii* in pond water. Each point is the mean ± standard deviation of the mean of measurements in six replicate limnocorrals. Means on the same day with the same letter are not significantly different (P < 0.05) based upon LSD values 25 and 26, respectively).

| Time (days) | Filaments/mL in Control Limnocorrals | Filaments/mL in Treatment Limnocorrals |
|---|---|---|
| 0 | 4,239[a] ± 309 | 3,258[a] ± 1,772 |
| 1 | 5,421[a] ± 432 | 2,797[b] ± 1,297 |
| 2 | 7,497[a] ± 343 | 2,768[b] ± 638 |
| 3 | 8,362[a] ± 689 | 2,249[b] ± 1,345 |
| 4 | 8,103[a] ± 1,123 | 3,575[b] ± 1,197 |
| 7 | 11,534[a] ± 914 | 7,036[b] ± 2,276 |

TABLE 26

Third efficacy study of the effect of DNA2-59-1 on the abundance of Microcystis spp. in pond water. Each point is the mean ± standard deviation of the mean of measurements in six replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
|---|---|---|
| 0 | 2,393[a] ± 353 | 2,393[a] ± 851 |
| 1 | 2,844a ± 346 | 2,018[a] ± 1,265 |
| 2 | 2,047[a] ± 401 | 1,528[a] ± 552 |
| 3 | 2,480[a] ± 339 | 2,537[a] ± 1,361 |
| 4 | 2,595[a] ± 511 | 3,056[a] ± 1,098 |
| 7 | 2,134[a] ± 288 | 3,349[a] ± 1,743 |

Numbers of green algae and diatoms began to increase dramatically in treatment limnocorrals three days after application of 0.3 μM DNA2-59-1 and were significantly higher than numbers in the pond water within the control limnocorrals (see data of Tables 27 and 28, respectively).

TABLE 27

Third efficacy study of the effect of DNA2-59-1 on the abundance of green algae in pond water. Each point is the mean ± standard deviation of the mean of measurements in six replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
|---|---|---|
| 0 | 1,499[a] ± 251 | 2,105[a] ± 230 |
| 1 | 1,187[a] ± 303 | 1,211[a] ± 260 |
| 2 | 1,672[a] ± 302 | 1,874[a] ± 333 |
| 3 | 1,442[a] ± 351 | 6,199[b] ± 564 |
| 4 | 2,307[a] ± 548 | 10,606[b] ± 1,803 |
| 7 | 2,708[a] ± 460 | 4,902[b] ± 577 |

TABLE 28

Third efficacy study of the effect of DNA2-59-1 on the abundance of diatoms in pond water. Each point is the mean ± standard deviation of the mean of measurements in six replicate limnocorrals. Means on the same day with the same letter are not significantly different (P < 0.05) based upon LSD values.

| Time (days) | Natural Units/mL in Control Limnocorrals | Natural Units/mL in Treatment Limnocorrals |
|---|---|---|
| 0 | 779[a] ± 203 | 1,009[a] ± 130 |
| 1 | 1,730[a] ± 382 | 1,672[a] ± 115 |
| 2 | 1,096[a] ± 188 | 4,527[b] ± 450 |
| 3 | 1,096[a] ± 243 | 19,637[b] ± 1,032 |
| 4 | 1,499[a] ± 231 | 61,649[b] ± 6,393 |
| 7 | 1,961[a] ± 263 | 43,829[b] ± 2,575 |

HPLC Determination of Anthraquinone Derivatives Level in Water Sample

Approximately 15 mL each of water samples from DNA2-59-1 efficacy testing that were designated for HPLC analysis were placed in scintillation vials and held in a freezer. Water samples were later melted at room temperature, and 5 mL of each sample was then filtered through a nylon membrane filter (13 mm diameter and 0.45

μm; Whatman International, Maidstone, England) using a 5 mL syringe (Hamilton Company, Reno, Nev.) and a 13 mm syringe filter holder (Fisher Scientific Company, Pittsburgh, Pa.). Filtrate (1 mL) was placed in 2 mL vials and capped using teflon/rubber septum caps (National Scientific Company, Jeddah, Saudia Arabia). The filter paper was removed and placed in a scintillation vial to which 2 mL of HPLC grade methanol (Fisher Scientific, Fair Lawn, N.J.) was added and then sonicated for 5 minutes. The methanol solution was then filtered using a nylon membrane acrodisc (25 mm and 0.45 μm; Pall Life Sciences, Ann Arbor, Mich.), and the methanol filtrate was placed in separate 2 mL vials.

Filtrate samples were analyzed using a Waters 2690 Alliance HPLC containing a 996 PDA detector and a XTerra RP 18 column (150 mm×4.6 mm, 5 μm particle size; Waters Corporation, Milford, Mass.). The mobile phase consisted of 25 mM sodium dihydrogenphosphate in 0.1% phosphoric acid (A) and acetonitrile (B). The gradient was from 80A/20B in 15 minutes to 40A/60B. After each run, a 5 minute wash with methanol was performed, followed by equilibrating the column for 10 minutes with 80A/20B. The temperature was set at 40° C., the flow rate was 1 mL/minute, the detection wavelength 256 nm, and the sample injection volume was 10 μL. All solvents used were HPLC grade (Fisher Scientific, Fair Lawn, N.J.).

Means and standard deviations of data were determined and graphed. The graphs were used to help determine the half-life of DNA2-59-1 in the pond water. Because of the short duration of the first efficacy study, the half-life of DNA2-59-1 in the pond water could not be determined. Results from the second and third efficacy study indicate a half-life of 19 hours for DNA2-59-1 in the pond water (see data of Tables 29 and 30, respectively).

TABLE 29

Second efficacy study of DNA2-59-1 with determination of dissipation rate and half-life in pond water. Each point is the mean ± standard deviation of the mean of measurements in six replicate limnocorrals.

| Time (hours) | DNA2-59-1 Levels (mg/L) in Pond Water |
|---|---|
| 0 | 94.8 ± 11.5 |
| 24 | 36.1 ± 4.5 |
| 48 | 16.3 ± 0.4 |
| 72 | 7.6 ± 0.7 |
| 168 | 0.0 ± 0.0 |

TABLE 30

Third efficacy study of DNA2-59-1 with determination of dissipation rate and half-life in pond water. Each point is the mean ± standard deviation of the mean of measurements in six replicate limnocorrals.

| Time (hours) | DNA2-59-1 Levels (mg/L) in Pond Water |
|---|---|
| 0 | 90.6 ± 7.9 |
| 24 | 31.5 ± 4.4 |
| 48 | 9.2 ± 3.2 |
| 72 | 2.2 ± 0.5 |
| 96 | 0.0 ± 0.0 |

The attempts to develop a reproducible analytical method to determine the levels of DNA1-19-1 in the pond water were unsuccessful. DNA1-19-1 is believed to bind quickly to suspended soil particles due to the positively charged nature of the 2-methylamino chain; evident by the lack of detection of DNA1-19-1 in the water. Since the levels of suspended soil particles in each water sample varied and an accurate measurement of the soil particles present in each sample could not be obtained, the consistent recoveries of DNA1-19-1 from the particulate portions of water samples could not be achieved. DNA1-19-1 could not be detected in soluble fractions of water samples collected at and after 24 hours after application of DNA1-19-1 to water within limnocorrals.

Laboratory Tests
Laboratory Screening of Anthraquinone Derivatives

The anthraquinone derivatives were screened for selective toxicity towards *Oscillatoria perornata*, previously isolated from a Mississippi catfish pond, using the method of Schrader et al. (A rapid bioassay for selective algicides. Weed Technol. (1997), vol. 11, pp. 767–774). The green alga *Selenastrum capricornutum* (obtained from the United States Environmental Protection Agency, Corvallis, Oreg.) was used as the representative green algal species in the bioassay since it is a common species found in southeastern United States catfish ponds. Absorbance readings were graphed, and graphs were used to determine the LOEC (lowest-observed-effect concentration) and the LCIC (lowest-complete-inhibition concentration) for each anthraquinone analog. In addition, a 96-hour 50% inhibition concentration (IC50) was determined for DNA1-19-1 and DNA2-59-1 by using the method described by Schrader et al. (K. K. Schradar, M. Q. de Regt, P. D. Tidwell, C. S. Tucker and S. O. Duke, Selective growth inhibition of the musty-odor producing cyanobacterium *Oscillatoria* cf. *chalybea* by natural compounds. Bull. Environ. Contam. Toxicol. (1998a), vol.60, pp. 651–658). Stock solutions of DNA1-19-1 and DNA2-59-1 were prepared so that final concentrations screened for 96-hour IC50 determinations were as follows: 1) 0, 0.01, 0.033, 0.1, 0.333, 1.0, 3.3, and 10.0 μM DNA1-19-1 for both *O. perornata* and *S. capricornutum;* 2) 0, 0.003, 0.01, 0.033, 0.1, 0.333, 1.0, and 3.333 μM DNA2-59-1 for *O. perornata*; and 3) 0, 0.1, 0.333, 1.0, 3.333, 10.0, 33.333, and 100.0 μM DNA2-59-1 for *S. capricornutum*. Estimation of the IC50 was determined by plotting 96-hour absorbance readings against logarithmic dilution values of the anthraquinone analogs. The screening results of the anthraquinone derivatives and commercially available analogs of anthraquinone are presented in Tables 31 and 32, respectively. Results of the IC50 determinations are presented in Table 33. The results in Table 31 reveal that DNA1-19-1 and DNA2-59-1 are the most promising analogs since these two compounds had the lowest LOEC and LCIC values for *O. perornata* (10 nM and 100 nM, respectively). Based upon IC50 results in Table 33, DNA2-59-1 appears to be more toxic and selective towards *O. perornata* than DNA1-19-1. Both DNA1-19-1 and DNA2-59-1 are very selectively toxic towards *O. perornata* compared to *S. capricornutum*.

TABLE 31

Rapid Screening Results of Modified 9, 10-Anthraquinone Analogs

| | Test Organism | | | |
|---|---|---|---|---|
| | *Oscillatoria perornata* | | *Selenastrum capricornutum* | |
| Test Compound | LOEC[a] (nM) | LCIC[b] (nM) | LOEC[a] (nM) | LCIC[b] (nM) |
| DNA1-19-1 | 10 | 100 | 10,000 | 10,000 |
| DNA2-23-1 | 100 | 1,000 | 10,000 | 10,000 |

TABLE 31-continued

Rapid Screening Results of Modified 9, 10-Anthraquinone Analogs

| | Test Organism | | | |
|---|---|---|---|---|
| | *Oscillatoria perornata* | | *Selenastrum capricornutum* | |
| Test Compound | LOEC[a] (nM) | LCIC[b] (nM) | LOEC[a] (nM) | LCIC[b] (nM) |
| DNA2-25-1 | 100 | 100 | 10,000 | 10,000 |
| DNA2-49-1 | 1,000 | 1,000 | 100,000 | 1 × 10$^6$ |
| DNA2-51-1 | 100 | 100 | 10,000 | 100,000 |
| DNA2-53-1 | 100 | 100 | 100,000 | 100,000 |
| DNA2-55-1 | 1,000 | 1,000 | 100,000 | 100,000 |
| DNA2-57-1 | 1,000 | 1,000 | 100,000 | 1 × 10$^6$ |
| DNA2-59-1 | 10 | 100 | 10,000 | 100,000 |
| DNA2-87-1 | 1,000 | 100,000 | 100,000 | 100,000 |
| DNA2-89-1 | 1,000 | 1,000 | 100,000 | 100,000 |
| DNA2-91-1 | 10,000 | 10,000 | 100,000 | 100,000 |
| DNA2-93-1 | 1,000 | 1,000 | 100,000 | 100,000 |
| DNA2-97-2 | 10,000 | 10,000 | >100,000 | >100,000 |
| DNA2-99-2 | 10,000 | 10,000 | >100,000 | >100,000 |
| DNA3-5-1 | 100 | 10,000 | >100,000 | >100,000 |
| DNA3-7-1 | 10,000 | 100,000 | >100,000 | >100,000 |
| DNA3-9-1 | 10,000 | 10,000 | >100,000 | >100,000 |
| DNA3-11-1 | 10,000 | 10,000 | >100,000 | >100,000 |
| DNA3-13-1 | 10,000 | 10,000 | 10 | >100,000 |
| DNA3-15-1 | 10,000 | 10,000 | 10 | >100,000 |
| DNA3-17-1 | 1,000 | 1,000 | 10,000 | 10,000 |
| DNA3-19-1 | 1,000 | 1,000 | 10,000 | 10,000 |
| DNA3-31-1 | 1,000 | 1,000 | 10,000 | 10,000 |
| DNA3-33-1 | 1,000 | 1,000 | 1,000 | 10,000 |
| DNA3-35-1 | 1,000 | 1,000 | 10,000 | 100,000 |
| DNA3-49-1 | 1,000 | 10,000 | >100,000 | >100,000 |
| DNA3-51-1 | 100 | 100,000 | >100,000 | >100,000 |
| DNA3-53-1 | 10,000 | 100,000 | 100,000 | >100,000 |
| DNA3-55-1 | 10,000 | 100,000 | >100,000 | >100,000 |
| DNA3-57-1 | 100 | 100,000 | >100,000 | >100,000 |
| DNA3-59-1 | 100 | 100,000 | >100,000 | >100,000 |
| DNA3-61-1 | 100 | 10,000 | >100,000 | >100,000 |
| DNA4-39-1 | 100 | 1,000 | 10,000 | 10,000 |

[a]LOEC = Lowest-observed-effect concentration; the concentration that inhibited growth but did not actually completely kill the test organism.
[b]LCIC = Lowest-complete-inhibition concentration; the concentration that completely killed the test organism.
nM = nanomolar concentration In addition to the novel anthraquinone analogs screened, several commercially available anthraquinone analogs (Sigma-Aldrich, St. Louis, Mo.) were screened to determine their toxicity towards *O. perornata* (Table 32).

TABLE 32

Rapid Screening Results of Commercially-available Analogs of 9, 10-Anthraquinone

| Test Compound | *Oscillatoria perornata* LCIC[a] (nM) | *Selenastrum capricornutum* LCIC[a] (nM) |
|---|---|---|
| 1-aminoanthraquinone | 100,000 | >100,000 |
| 2-aminoanthraquinone | >100,000 | >100,000 |
| 1-(methylamino) anthraquinone | 100,000 | >100,000 |
| anthraquinone-1,5-disulfonic acid | >1,000,000 | >1,000,000 |
| anthraquinone-2-carboxylic acid | >1,000,000 | >1,000,000 |
| 2-hydroxymethyl-anthraquinone | 10,000 | 100,000 |
| 1,4-dihydroxyanthraquinone | >100,000 | >100,000 |
| 1,8-dihydroxyanthraquinone | 100,000 | >100,000 |

LCIC[a] = Lowest-complete-inhibition concentration; the concentration that completely killed the test organism.
nM = nanomolar

TABLE 33

IC50[a] Determination of DNA1-19-1 and DNA2-59-1

| | Test Organism | |
|---|---|---|
| Test Compound | *Oscillatoria perornata* IC50[a] (nM) | *Selenastrum capricornutum* IC50[a] (nM) |
| DNA1-19-1 | 63 | 5,012 |
| DNA2-59-1 | 6.3 | 5,623 |

[a]IC50 = 96-hour 50% inhibition concentration.
nM = nanomolar concentration

We claim:
1. A compound selected from the group consisting of:

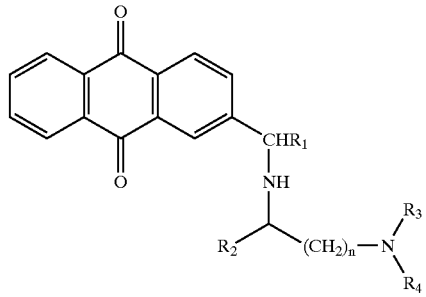

wherein $R_1$ is hydrogen or methyl; $R_2$, $R_3$ and $R_4$ are independently selected from hydrogen, methyl and ethyl; n is 1–6; and wherein the compound is a free amine or environmentally acceptable acid amine salt;

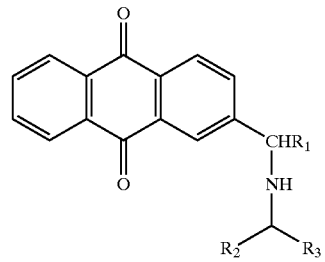

wherein $R_1$ is hydrogen or methyl, $R_2$, and $R_3$ are independently selected from hydrogen, methyl, ethyl, straight-chain alkyl group having 3 to 8 carbon atoms and cyclic alkyl group having 3 to 6 carbon atoms, and wherein the compound is a free amine or environmentally acceptable acid amine salt, with the proviso that not both $R_2$ and $R_3$ are hydrogen; and

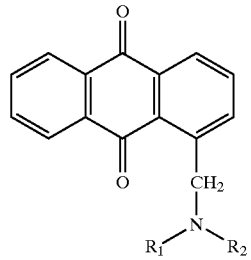

wherein $R_1$ and $R_2$ are independently selected from methyl, ethyl, straight-chain alkyl group having 3 to 8 carbon atoms and cyclic alkyl group having 3 to 6 carbon atoms, and wherein the compound is a free amine or environmentally acceptable acid amine salt.

2. The compound of claim 1 selected from the group consisting of:

2-[methylamino-N-(1'-methylethyl)]-9,10-anthraquinone monophosphate,

2-[methylamino-N-(1'-methyl-4'-N'N'-diethyl-aminobutyl)]-9,10-anthraquinone diphosphate, 2-[methylamino-N-(3'-N,N-diethylaminopropyl)]-9,10-anthraquinone diphosphate, 2-[methylamino-N-(1'-methylethyl)]-9,10-anthraquinone monophosphate.

3. The compound of claim 2, wherein said compound is 2-[methylamino-N-(1'-methylethyl)]-9,10-anthraquinone monophosphate.

4. The compound of claim 2, wherein said compound is 2-[methylamino-N-(1'-methyl-4'-N'N'-diethylaminobutyl)]-9,10-anthraquinone diphosphate.

5. A method of selectively controlling the growth of blue-green algae in a water source comprising applying an algaecidal amount of the compound of claim 4 to said water source.

6. The method of claim 5 wherein the compound is applied to the aqueous medium at a concentration ranging from about 0.038 ppm to about 0.125 ppm.

7. A method of selectively controlling the growth of blue-green algae in a water source comprising applying an algaecidal amount of the compound of claim 1 to such a water source.

8. A method of selectively controlling the growth of blue-green algae in a water source comprising applying an algaecidal amount of the compound of claim 2 to such a water source.

9. A method of selectively controlling the growth of blue-green algae in a water source comprising applying an algaecidal amount of the compound of claim 3 to such a water source.

10. The method of claim 7 wherein the compound is applied to the aqueous medium at a concentration of ranging from about 0.038 ppm to about 0.125 ppm.

11. The method of claim 8 wherein the compound is applied to the aqueous medium at a concentration of ranging from about 0.038 ppm to about 0.125 ppm.

12. The method of claim 9 wherein the compound is applied to the aqueous medium at a concentration of ranging from about 0.038 ppm to about 0.125 ppm.

* * * * *